United States Patent
Forutanpour et al.

(10) Patent No.: US 10,304,203 B2
(45) Date of Patent: May 28, 2019

(54) THREE-DIMENSIONAL MODEL GENERATION

(71) Applicant: QUALCOMM Incorporated, San Diego, CA (US)

(72) Inventors: Bijan Forutanpour, San Diego, CA (US); Michel Adib Sarkis, San Diego, CA (US); Sairam Sundaresan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/857,289

(22) Filed: Sep. 17, 2015

(65) Prior Publication Data
US 2016/0335809 A1    Nov. 17, 2016

Related U.S. Application Data

(60) Provisional application No. 62/161,755, filed on May 14, 2015.

(51) Int. Cl.
*G06T 15/04* (2011.01)
*G06T 17/00* (2006.01)
(Continued)

(52) U.S. Cl.
CPC .............. *G06T 7/579* (2017.01); *G06T 5/005* (2013.01); *G06T 7/50* (2017.01); *G06T 15/04* (2013.01); *G06T 17/00* (2013.01); *G06T 2200/32* (2013.01)

(58) Field of Classification Search
CPC .......... G06T 19/20; G06T 17/20; G06T 15/20; G06T 11/001; G06T 15/04; G06T 11/60;
(Continued)

(56) References Cited

U.S. PATENT DOCUMENTS 6,101,272 A    8/2000  Noguchi
6,186,948 B1   2/2001  Kamiyama et al.
(Continued)

FOREIGN PATENT DOCUMENTS

CN    102364953 A    2/2012
CN    102387371 A    3/2012
(Continued)

OTHER PUBLICATIONS

Alshawabkeh, Y., et al., "Automatic Multi-Image Photo-Texturing of Complex 3D Scenes," CIPA 2005 International Symposium, Sep. 2005, CIPA Heritage Documentation, pp. 1-6.
(Continued)

*Primary Examiner* — Ke Xiao
*Assistant Examiner* — Andrew Shin
(74) *Attorney, Agent, or Firm* — Toler Law Group, PC.

(57) ABSTRACT

A method for texture reconstruction associated with a three-dimensional scan of an object includes scanning, at a processor, a sequence of image frames captured by an image capture device at different three-dimensional viewpoints. The method also includes generating a composite confidence map based on the sequence of image frames. The composite confidence map includes pixel values for scanned pixels in the sequence of image frames. The method further includes identifying one or more holes of a three-dimensional model based on the composite confidence map.

24 Claims, 12 Drawing Sheets

(51) Int. Cl.
    *G06T 7/55* (2017.01)
    *G06T 7/579* (2017.01)
    *G06T 7/50* (2017.01)
    *G06T 5/00* (2006.01)

(58) Field of Classification Search
    CPC ........ G09G 5/02; G01B 11/303; H04N 1/193; H04N 1/107
    USPC ....... 345/419, 420, 427, 581, 582, 589, 619; 382/108, 276, 312, 313
    See application file for complete search history.

(56) References Cited

U.S. PATENT DOCUMENTS

| | | |
|---|---|---|
| 6,281,904 B1 | 8/2001 | Reinhardt et al. |
| 6,297,825 B1 | 10/2001 | Madden et al. |
| 6,469,710 B1 | 10/2002 | Shum et al. |
| 6,476,803 B1 | 11/2002 | Zhang et al. |
| 6,487,304 B1 | 11/2002 | Szeliski |
| 6,750,873 B1 | 6/2004 | Bernardini et al. |
| 8,036,441 B2 | 10/2011 | Frank et al. |
| 8,149,268 B1 | 4/2012 | Meyers et al. |
| 8,326,035 B2 | 12/2012 | Ubillos et al. |
| 8,471,890 B1 | 6/2013 | Golas |
| 8,587,583 B2 | 11/2013 | Newcombe et al. |
| 8,909,625 B1 | 12/2014 | Stewenius |
| 8,941,652 B1* | 1/2015 | Allen ............... G06T 17/20 345/420 |
| 9,147,279 B1 | 9/2015 | Bruce et al. |
| 2003/0001837 A1 | 1/2003 | Baumberg |
| 2004/0189686 A1 | 9/2004 | Tanguay, Jr. et al. |
| 2005/0057561 A1* | 3/2005 | El-Din ElShishiny ............... G06T 17/20 345/419 |
| 2005/0140670 A1 | 6/2005 | Wu et al. |
| 2005/0285872 A1 | 12/2005 | Wang et al. |
| 2006/0087517 A1 | 4/2006 | Mojsilovic |
| 2007/0132874 A1 | 6/2007 | Forman et al. |
| 2010/0074532 A1 | 3/2010 | Gordon et al. |
| 2010/0156834 A1 | 6/2010 | Sangster |
| 2010/0223032 A1 | 9/2010 | Reghetti et al. |
| 2011/0187820 A1 | 8/2011 | Gilboa et al. |
| 2012/0177269 A1 | 7/2012 | Lu et al. |
| 2012/0182392 A1 | 7/2012 | Kearns et al. |
| 2012/0300020 A1 | 11/2012 | Arth et al. |
| 2013/0004060 A1* | 1/2013 | Bell ............... G01S 17/89 382/154 |
| 2013/0100119 A1 | 4/2013 | Evertt et al. |
| 2013/0136341 A1 | 5/2013 | Yamamoto |
| 2013/0148851 A1 | 6/2013 | Leung et al. |
| 2013/0253325 A1 | 9/2013 | Call et al. |
| 2013/0272570 A1 | 10/2013 | Sheng et al. |
| 2013/0286161 A1 | 10/2013 | Lv et al. |
| 2013/0293686 A1 | 11/2013 | Blow et al. |
| 2013/0314501 A1 | 11/2013 | Davidson et al. |
| 2013/0322767 A1 | 12/2013 | Chao et al. |
| 2013/0336589 A1 | 12/2013 | Takahashi et al. |
| 2014/0002597 A1 | 1/2014 | Taguchi et al. |
| 2014/0037140 A1 | 2/2014 | Benhimane et al. |
| 2014/0132715 A1 | 5/2014 | Raghoebardayal et al. |
| 2014/0168262 A1 | 6/2014 | Forutanpour et al. |
| 2014/0210947 A1 | 7/2014 | Finn et al. |
| 2014/0219551 A1* | 8/2014 | Tang ............... H04N 13/0011 382/154 |
| 2014/0225985 A1 | 8/2014 | Klusza et al. |
| 2014/0267618 A1 | 9/2014 | Esteban et al. |
| 2014/0270480 A1 | 9/2014 | Boardman et al. |
| 2014/0321702 A1 | 10/2014 | Schmalstieg |
| 2014/0368620 A1 | 12/2014 | Li et al. |
| 2015/0049083 A1 | 2/2015 | Bidne et al. |
| 2015/0098645 A1 | 4/2015 | Leung |
| 2015/0161762 A1* | 6/2015 | Fujiwara ............... G06T 11/60 345/633 |
| 2015/0178988 A1 | 6/2015 | Montserrat Mora et al. |
| 2015/0187140 A1 | 7/2015 | Tseng et al. |
| 2015/0221126 A1* | 8/2015 | Liu ............... G06T 15/20 382/276 |
| 2015/0302601 A1 | 10/2015 | Rivet-Sabourin |
| 2016/0005211 A1 | 1/2016 | Sarkis et al. |
| 2016/0086336 A1 | 3/2016 | Lin et al. |
| 2016/0171767 A1 | 6/2016 | Anderson |
| 2016/0221262 A1* | 8/2016 | Das ............... G03F 7/70416 |
| 2016/0232715 A1 | 8/2016 | Lee |
| 2016/0323557 A1 | 11/2016 | Drazic et al. |
| 2016/0335782 A1 | 11/2016 | Sundaresan |
| 2016/0335792 A1 | 11/2016 | Forutanpour |
| 2018/0103209 A1 | 4/2018 | Fischler et al. |

FOREIGN PATENT DOCUMENTS

| | | |
|---|---|---|
| EP | 1022654 A2 | 7/2000 |
| EP | 2545411 B1 | 2/2014 |
| JP | 2010020487 A | 1/2010 |
| WO | 9926198 A2 | 5/1999 |
| WO | 2013165440 A1 | 11/2013 |

OTHER PUBLICATIONS

"Artec Studio 9 User Guide v 9.2," Retrieved from <<http://artec-group.com/sw/ug/ug.pdf>>, Jun. 5, 2014, Artec Group, Luxembourg, 135 pages.

Cooper, T., et al., "A Novel Approach to Color Cast Detection and Removal in Digital Images," Part of the IS&T/SPIE Conference on Color Imaging: Device-Independent Color, Color Hardcopy, and Graphic Arts V, Jan. 2000, vol. 3963, SPIE, Bellingham, WA, pp. 167-177.

Du, H., et al., "Interactive 3D Modeling of Indoor Environments with a Consumer Depth Camera," Proceedings of the 13th International Conference on Ubiquitous Computing, Sep. 17, 2011, ACM, New York, New York, pp. 75-84.

Gasparini, F., et al., "Color Balancing of Digital Photos Using Simple Image Statistics", Pattern Recognition, 2004, vol. 37, Elsevier, Amsterdam, The Netherlands, pp. 1201-1217.

Ha, J., et al., "Real-time Scalable Recognition and Tracking based on the Server-client Model for Mobile Augmented Reality," VR Innovation (ISVRI), 2011 IEEE International Symposium on, Mar. 19, 2011, IEEE Piscataway NJ, pp. 267-272.

Herrera, C. D., et al., "Joint Depth and Color Camera Calibration with Distortion Correction," IEEE Transactions on Pattern Analysis and Machine Intelligence, May 29, 2012, vol. 34, Issue 10, IEEE, Piscataway, New Jersey, pages pp. 1-8.

International Search Report and Written Opinion for International Application No. PCT/US2016/020474, ISA/EPO, dated Jun. 8, 2016, 14 pages.

Khalfaoui, S., et al., "Fully Automatic 3D Digitization of unknown Objects using Progressive Data Bounding Box," Proceedings of SPIE, Three-Dimensional Image Processing (3DIP) and Applications II, Feb. 2012, vol. 829011, SPIE, Bellingham, Washington, 8 pages.

Neugebauer, P., et al., "Texturing 3D Models of Real World Objects from Multiple Unregistered Photographic Views," Computer Graphics Forum, Sep. 1999, vol. 18, Issue 3, John Wiley & Sons, Hoboken, NJ, pp. C-245-C-256 and C-413.

Niem, W., "Automatic Reconstruction of 3D Objects using a Mobile Camera," Image and Vision Computing, Feb. 1999, vol. 17, No. 2, Elsevier, Amsterdam, The Netherlands, p. 131.

Ofek, E., et al., "Multiresolution Textures from Image Sequences," IEEE Computer Graphics and Applications, Mar. 1997, vol. 17, No. 2, IEEE, Piscataway, NJ, pages pp. 20,21.

Pulli, K., et al., "Acquisition and Visualization of Colored 3D Objects," Pattern Recognition, 1998. Proceedings, Fourteenth International Conference on, Aug. 1998, vol. 1, IEEE, Piscataway, NJ, pp. 11-15.

Vacchetti, L., et al., "Fusing Online and Offline Information for Stable 3D Tracking in Real-time," Proceedings of the IEEE Computer Conference on Computer Vision and Pattern Recognition, Jun. 2003, vol. 2, Piscataway, New Jersey, pp. 241-248.

(56) References Cited

OTHER PUBLICATIONS

Weng, C.-C., et al., "A Novel Automatic White Balance Method for Digital Still Cameras," 2005 IEEE Symposium on Circuits and Systems, May 23-26, 2005, vol. 4, IEEE, Piscataway, NJ, pp. 3801-3804.

Zhang, D., et al., "Photorealistic 3D Volumetric Model Reconstruction by Voxel Coloring," IAPRS, Sep. 2010, vol. XXXVIII, Part 3B, International Society for Photogrammetry and Remote Sensing, pp. 92-97.

Baumberg, A., "Blending images for texturing 3D models", Proc. Conf. on British Machine Vision Association, 2002, British Machine Vision Association, Durham, England, pp. 404-413.

Benhimane, S., et al., "Real-Time Image-Based Tracking of Planes using Efficient Second-Order Minimization," Intelligent Robots and Systems (IROS 2004), Proceedings of IEEE/RSJ International Conference on, 2004, vol. 1, IEEE, Piscataway, NJ, pp. 943-948.

Berger, K., et al., "A State of the Art Report on Kinect Sensor Setups in Computer Vision," Time-of-Flight and Depth Imaging Sensors, Algorithms, and Applications, Lecture Notes in Computer Science, 2013, vol. 8200, Springer-Verlag, Berlin, Germany, pp. 257-272.

"Dense Visual SLAM," Technical University of Munich, retrieved from <<http://vision.in.turn.de/data/software/dvo>>, retrieved on May 1, 2014, Munich, Germany, 4 pages.

Gorman, M, "Lynx A 3D point-and-shoot camera/tablet does motion capture and 3D modeling, we go hands-on," Apr. 17, 2013, engadget, AOL, New York, New York, 3 pages.

Grammatikopoulos, L., et al., "Automatic Multi-View Texture Mapping of 3d Surface Projections," Proceedings of the 2nd ISPRS International Workshop 3D-ARCH, 2007, International Society for Photogrammetry and remote Sensing, International Council for Science, Paris, France, 6 Pages.

Huo, J.-Y., et al., "Robust Automatic White Balance Algorithm using Gray Color Points in Images" Consumer Electronics, IEEE Transactions on, vol. 52, No. 2, May 2006, IEEE, Piscataway, NJ, pp. 541-546.

Kerl, C., et al., "Dense Visual SLAM for RGB-D Cameras," Proceedings of IEEE/RSJ International Conference on Intelligent Robots and Systems (IROS), 2013, IEEE, Piscataway, NJ, pp. 2100-2106.

Kerl, C., et al., "Robust Odometry Estimation for RGB-D Cameras," IEEE International Conference on Robotics and Automation (ICRA), 2013, IEEE, Piscataway, NJ, pp. 3748-3754.

Kim, S., et al., "Relocalization Using Virtual Keyframes for Online Environment Map Construction," In the 16th ACM Symposium on Virtual Reality Software and Technology (VRST), Nov. 2009, ACM, New York, New York, pp. 127-134.

Klein, G., et al., "Parallel Tracking and Mapping for Small AR Workspaces," 6th IEEE and ACM International Symposium on Mixed and Augmented Reality, 2007, ISMAR 2007, IEEE, Piscataway, NJ, pp. 225-234.

Lempitsky, V., et al., "Seamless Mosaicing of Image-Based Texture Maps," IEEE Conference on Computer Vision and Pattern Recognition, CVPR '07, 2007, IEEE, Piscataway, NJ, 6 Pages.

Li, M., et al., "3-D Motion Estimation and Online Temporal Calibration for Camera-IMU Systems," 2013 IEEE International Conference on Robotics and Automation (ICRA), 2013, IEEE, Piscataway, NJ, pp. 5709-5716.

Pighin, F., et al., "Synthesizing Realistic Facial Expressions from Photographs," SIGGRAPH '98: Proceedings of the 25th annual conference on Computer graphics and interactive techniques, 1998, ACM, New York, New York, pp. 75-84.

Shinozaki, M., et al., "Correction of Color Information of a 3D Model using a Range Intensity Image," Computer Vision and Image Understanding, 2009, vol. 113, Elsevier, Amsterdam, Netherlands, pp. 1170-1179.

Whelan, T., et al., "Robust Real-Time Visual Odometry for Dense RGB-D Mapping," IEEE International Conference on Robotics and Automation (ICRA), 2013, IEEE, Piscataway, NJ, pp. 5724-5731.

Rohs M., "Marker-Based Embodied Interaction for Handheld Augmented Reality Games", JVRB Journal of Virtual Reality and Broadcasting, Feb. 6, 2007, Retrieved from Internet on Oct. 24, 2016, https://www.jvrb.org/pastissues/4.2007/793, pp. 1-15.

Gouraud H., et al., "Continuous Shading of Curved Surfaces", IEEE Transactions on Computers, vol. C-20, No. 6, Jun. 1971, pp. 87-93.

Pollefeys M., et al., "Visual Modeling with a Hand-Held Camera", International Journal of Computer Vision, Kluwer Academic Publishers, BO, vol. 59, No. 3, Sep. 1, 2004 (Sep. 1, 2004), XP002519335, pp. 207-232.

Anonymous: "Hands on with Trnio, the Smartphone 3D Scanner", Jun. 30, 2014, XP055427447, Retrieved from the Internet: URL: http://www.fabbaloo.com/blog/2014/6/29/hands-on-with-trnio-the-smartphone-3d-scanner [retrieved on Nov. 21, 2017], 4 pages.

Anonymous: "Microsoft Can Turn Your Smartphone Camera into a 3D Scanner—SPAR 3D", Aug. 26, 2015, XP055427454, Retrieved from the Internet: URL:https://www.spar3d.com/news/hardware/vol13no34-microsoft-mobilefusion-smartphone-camera-3d-scanner/ [retrieved on Nov. 21, 2017], 3 pages.

Anonymous: "TRNIO: Kosten Loser 3D-Scanner fUr iPhone und iPad—3Druck.com", Jun. 28, 2014, XP055427816, Retrieved from the Internet: URL:https://3druck.com/programme/trnio-kostenloser-3d-scanner-fuer-iphone-und-pad-2920153/ [retrieved on Nov. 22, 2017], 1 page.

\* cited by examiner

THREE-DIMENSIONAL MODEL GENERATION

I. CLAIM OF PRIORITY

The present application claims priority from U.S. Provisional Patent Application No. 62/161,755 entitled "THREE-DIMENSIONAL MODEL GENERATION," filed May 14, 2015, the contents of which are incorporated by reference in their entirety.

II. RELATED APPLICATIONS

The present application is related to U.S. patent application Ser. No. 14/491,857, entitled "SYSTEM AND METHOD OF POSE ESTIMATION," filed Sep. 19, 2014, and related to U.S. patent application Ser. No. 14/469,468, entitled "SYSTEM AND METHOD OF THREE-DIMENSIONAL MODEL GENERATION," filed Aug. 26, 2014, the contents of which are incorporated by reference in their entirety.

III. FIELD

The present disclosure is generally related to three-dimensional (3D) model generation.

IV. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Wireless telephones, unmanned vehicles (e.g., drones), robots, aircraft, automobiles, mounted cameras, personal cameras, and other devices may be configured to capture images. Such images may be used to generate a three-dimensional (3D) model of an object. Generally, devices for generating 3D models do not generate the 3D models in real time or near real time relative to the rate of capturing the images. Rather, a sequence of image frames is captured (e.g., by a camera), and the sequence of image frames is subsequently processed as a group (e.g., concurrently at a processing system, such as a computer) to generate the 3D model. If the sequence of image frames is insufficient or inadequate to generate a complete 3D model, such insufficiency or inadequacy may go unnoticed until after processing to generate the 3D model is completed. In this case, an incomplete or inaccurate 3D model may be generated. To generate a more complete or more accurate 3D model, a new sequence of images of the object may be captured and processed.

V. SUMMARY

According to one implementation of the disclosed techniques, an apparatus includes interface circuitry configured to receive image frames of an object. The image frames are associated with a three-dimensional scan of the object. The apparatus also includes a processor configured to scan a first image frame of a sequence of the image frames. The processor is further configured to determine a grayscale threshold based on characteristics of the first image frame and to identify gray pixel candidates in the first image frame based on the grayscale threshold. The processor is also configured to adjust a pixel value of each pixel in the first image frame based on a chromatic adaptation transform estimation. The chromatic adaptation transform estimation is based on the gray pixel candidates. The grayscale threshold may be computed for each image frame in the sequence of image frames.

According to another implementation of the disclosed techniques, a method for adjusting pixel colors between image frames includes scanning, at a processor, a first image frame of a sequence of image frames. The method also includes determining a grayscale threshold based on characteristics of the first image frame and identifying gray pixel candidates in the first image frame based on the grayscale threshold. The method further includes adjusting a pixel value of each pixel in the first image frame based on a chromatic adaptation transform estimation. The chromatic adaptation transform estimation is based on the gray pixel candidates. The grayscale threshold may be computed for each image frame in the sequence of image frames.

According to another implementation of the disclosed techniques, a non-transitory computer-readable medium includes instructions for adjusting pixel colors between image frames. The image frames are associated with a three-dimensional scan of an object. The instructions, when executed by a processor, cause the processor to perform operations. The operations include scanning a first image frame of a sequence of image frames. The operations also include determining a grayscale threshold based on characteristics of the first image frame and identifying gray pixel candidates in the first image frame based on the grayscale threshold. The operations further include adjusting a pixel value of each pixel in the first image frame based on a chromatic adaptation transform estimation. The chromatic adaptation transform estimation is based on the gray pixel candidates. The grayscale threshold may be computed for each image frame in the sequence of image frames.

According to another implementation of the disclosed techniques, an apparatus includes means for scanning a first image frame of a sequence of image frames. The apparatus also includes means for determining a grayscale threshold based on characteristics of the first image frame and means for identifying gray pixel candidates in the first image frame based on the grayscale threshold. The apparatus further includes means for adjusting a pixel value of each pixel in the first image frame based on a chromatic adaptation transform estimation. The chromatic adaptation estimation is based on the gray pixel candidates. The grayscale threshold may be computed for each image frame in the sequence of image frames.

According to another implementation of the disclosed techniques, an apparatus includes interface circuitry configured to receive a sequence of image frames of an object. The sequence of image frames is associated with a three-dimensional scan of the object. The apparatus also includes a processor configured to prioritize the sequence of image frames in a queue based on one or more prioritization parameters. The one or more prioritization parameters includes an image frame timestamp weight, an image frame blur weight, an image frame color shift weight, an image frame face weight, or an image frame validity weight. The processor is also configured to select a first image frame from the queue. The first image frame depicts a particular texture pixel from a first angle. The processor is further configured to determine a pixel value of the particular texture pixel in the first image frame. The processor is also configured to select a second image frame from the queue. The second image frame depicts the particular texture pixel from a second angle, and the second image frame has a higher priority than the first image frame based on the one or more prioritization parameters. The processor is further configured to modify the pixel value of the particular texture pixel based on a pixel value of the particular texture pixel in the second image frame to generate a modified pixel value of the particular texture pixel.

According to another implementation of the disclosed techniques, a method for determining a pixel value of a texture pixel associated with a three-dimensional scan of an object includes prioritizing, at a processor, a sequence of image frames in a queue, wherein the sequence of image frames is captured from an image capture device, and where the sequence of image frames is prioritized based on one or more prioritization parameters. The one or more prioritization parameters includes an image frame timestamp weight, an image frame blur weight, an image frame color shift weight, an image frame face weight, or an image frame validity weight. The method also includes selecting a first image frame from the queue. The first image frame depicts a particular texture pixel from a first angle. The method also includes determining a pixel value of the particular texture pixel in the first image frame. The method further includes selecting a second image frame from the queue. The second image frame depicts the particular texture pixel from a second angle, and the second image frame has a higher priority than the first image frame based on the one or more prioritization parameters. The method also includes modifying the pixel value of the particular texture pixel based on a pixel value of the particular texture pixel in the second image frame to generate a modified pixel value of the particular texture pixel.

According to another implementation of the disclosed techniques, a non-transitory computer-readable medium includes instructions for determining a pixel value of a texture pixel associated with a three-dimensional scan of an object. The instructions, when executed by a processor, cause the processor to perform operations. The operations include prioritizing a sequence of image frames in a queue, where the sequence of image frames is captured from an image capture device, and where the sequence of image frames is prioritized based on one or more prioritization parameters. The one or more prioritization parameters includes an image frame timestamp weight, an image frame blur weight, an image frame color shift weight, an image frame face weight, or an image frame validity weight. The operations also comprise selecting a first image frame from the queue. The first image frame depicts a particular texture pixel from a first angle. The operations also include determining a pixel value of the particular texture pixel in the first image frame. The operations further include selecting a second image frame from the queue. The second image frame depicts the particular texture pixel from a second angle, and the second image frame has a higher priority than the first image frame based on the one or more prioritization parameters. The operations also include modifying the pixel value of the particular texture pixel based on a pixel value of the particular texture pixel in the second image frame to generate a modified pixel value of the particular texture pixel.

According to another implementation of the disclosed techniques, an apparatus includes means for prioritizing a sequence of image frames in a queue. The sequence of images frames is captured from an image capture device. The sequence of image frames is prioritized based on one or more prioritization parameters. The one or more prioritization parameters includes an image frame timestamp weight, an image frame blur weight, an image frame color shift weight, an image frame face weight, or an image frame validity weight. The apparatus also includes means for selecting a first image frame from the queue. The first image frame depicts a particular texture pixel from a first angle. The apparatus further includes means for determining a pixel value of the particular texture pixel in the first image frame. The apparatus also includes means for selecting a second image frame from the queue. The second image frame depicts the particular texture pixel from a second angle. The second image frame has a higher priority than the first image frame based on the one or more prioritization parameters. The apparatus further includes means for modifying the pixel value of the particular pixel based on a pixel value of the particular pixel in the second image frame to generate a modified pixel value of the particular pixel.

According to another implementation of the disclosed techniques, an apparatus includes interface circuitry configured to receive a sequence of image frames associated with a three-dimensional scan of an object. The apparatus also includes a processor configured to generate a composite confidence map based on the sequence of image frames. The composite confidence map includes pixel values for scanned pixels in the sequence of image frames. The processor is further configured to identify one or more holes of a three-dimensional model based on the composite confidence map.

According to another implementation of the disclosed techniques, a method for texture reconstruction associated with a three-dimensional scan of an object includes scanning, at a processor, a sequence of image frames captured by an image capture device at different three-dimensional viewpoints. The method also includes generating a composite confidence map based on the sequence of image frames. The composite confidence map includes pixel values for scanned pixels in the sequence of image frames. The method further includes identifying one or more holes of a three-dimensional model based on the composite confidence map.

According to another implementation of the disclosed techniques, a non-transitory computer-readable medium includes instructions for texture reconstruction associated with a three-dimensional scan of an object. The instructions, when executed by a processor, cause the processor to perform operations. The operations include scanning a sequence of image frames captured by an image captured device at different three-dimensional viewpoints. The operations also include generating a composite confidence map based on the sequence of image frames. The composite confidence map includes pixel values for scanned pixels in the sequence of image frames. The operations further include identifying one or more holes of a three-dimensional model based on the composite confidence map.

According to another implementation of the disclosed techniques, an apparatus includes means for capturing a sequence of image frames associated with a three-dimensional scan of an object and means for generating a composite confidence map based on the sequence of image frames. The composite confidence map includes pixel values for scanned pixels in the sequence of image frames. The apparatus further includes means for identifying one or more holes of a three-dimensional model based on the composite confidence map.

According to another implementation of the disclosed techniques, an apparatus includes a processor and a memory storing instructions executable by the processor to perform operations. The operations include generating a camera pose error correction matte. Generating the camera pose error correction matte includes rendering a depth map with depth culling using perspective key frame camera information. Generating the camera pose error correction matte also includes generating an external silhouette matte in camera space based on the rendered depth map and generating an internal silhouette matte in camera space based on the rendered depth map. Generating the camera pose error correction matte further includes performing fall-off blend processing on the external silhouette matte and on the internal silhouette matte. The operations also include generating a camera seam matte and determining a color of a particular texture pixel based on the camera pose error correction matte and the camera seam matte.

According to another implementation of the disclosed techniques, a method for determining a color of a texture pixel associated with a three-dimensional scan of an object includes generating a camera pose error correction matte. Generating the camera pose error correction matte includes rendering a depth map with depth culling using perspective key frame camera information. Generating the camera pose error correction matte also includes generating an external silhouette matte in camera space based on the rendered depth map and generating an internal silhouette matte in camera space based on the rendered depth map. Generating the camera pose error correction matte further includes performing fall-off blend processing on the external silhouette matte and on the internal silhouette matte. The method also includes generating a camera seam matte and determining a color of a particular texture pixel based on the camera pose error correction matte and the camera seam matte.

According to another implementation of the disclosed techniques, a non-transitory computer readable medium includes instructions for determining a color of a texture pixel associated with a three-dimensional scan of an object. The instructions, when executed by a processor, cause the processor to perform operations including generating a camera pose error correction matte. Generating the camera pose error correction matte includes rendering a depth map with depth culling using perspective key frame camera information. Generating the camera pose error correction matte also includes generating an external silhouette matte in camera space based on the rendered depth map and generating an internal silhouette matte in camera space based on the rendered depth map. Generating the camera pose error correction matte further includes performing fall-off blend processing on the external silhouette matte and on the internal silhouette matte. The operations also include generating a camera seam matte and determining a color of a particular texture pixel based on the camera pose error correction matte and the camera seam matte.

According to another implementation of the disclosed techniques, an apparatus includes means for generating a camera pose error correction matte. The means for generating the camera pose error correction matte includes means for rendering a depth map with depth culling using perspective key frame camera information. The means for generating the camera pose error correction matte also includes means for generating an external silhouette matte in camera space based on the rendered depth map and means for generating an internal silhouette matte in camera space based on the rendered depth map. The means for generating the camera pose error correction matte further includes means for performing fall-off blend processing on the external silhouette matte and on the internal silhouette matte. The apparatus also includes means for generating a camera seam matte and means for determining a color of a particular texture pixel based on the camera pose error correction matte and the camera seam matte.

VI. BRIEF DESCRIPTION OF THE DRAWINGS

VII. DETAILED DESCRIPTION

Particular aspects of the present disclosure are described with reference to the drawings. In the description, common features are designated by common reference numbers throughout the drawings. The techniques described below are generally applicable to a mobile device. However, it will be appreciated that the techniques are also applicable to an unmanned vehicle (e.g., a drone), a robot, an aircraft, an automobile, a mounted camera, a personal camera, a processing system communicatively coupled to mounted cameras, other devices that are attached to (or included within) a processing device compatible to generate a 3D model, etc.

Figure 1:
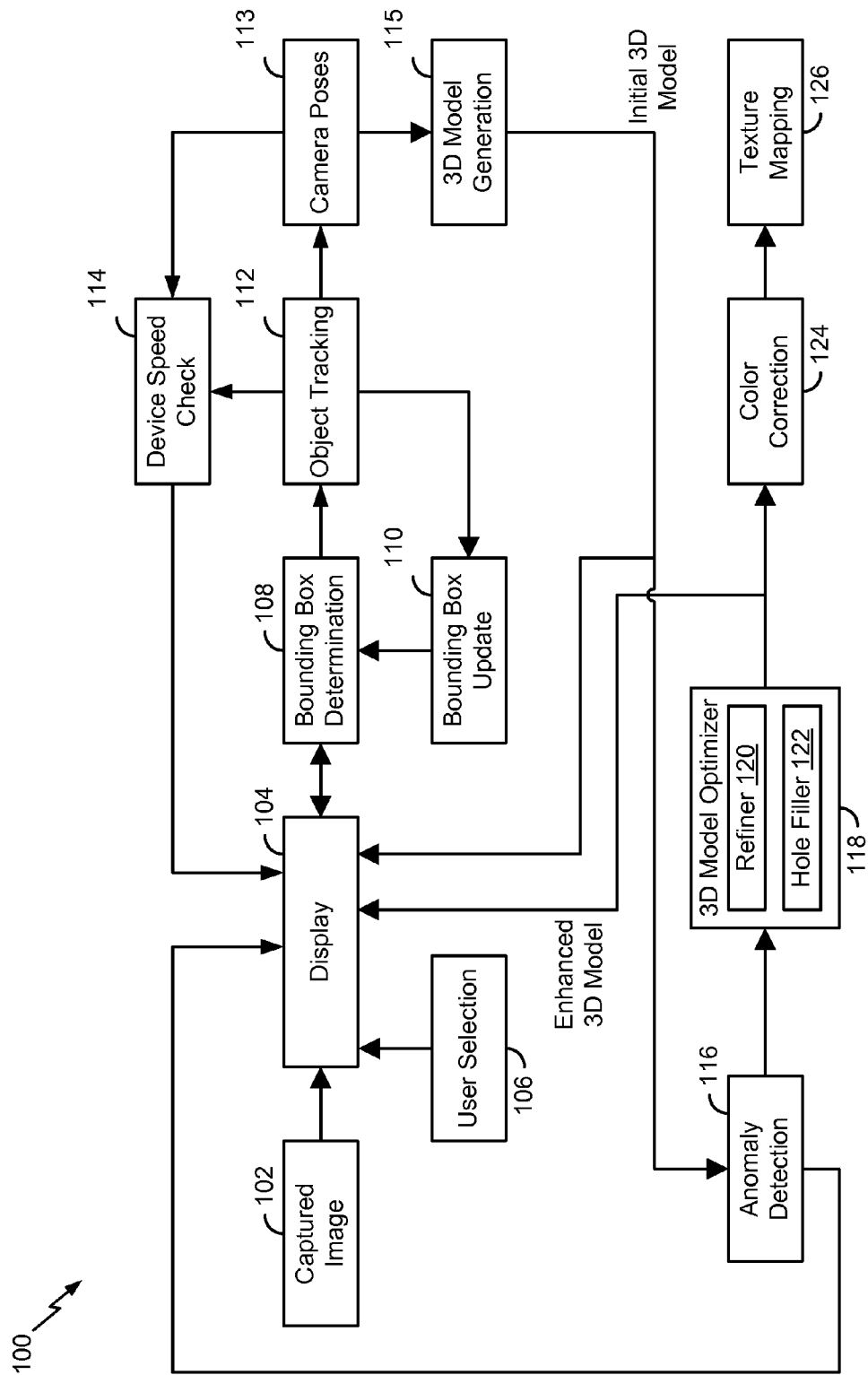
FIG. 1 is a block diagram of a system that is operable to generate a three-dimensional (3D) model based on a sequence of image frames.

FIG. 1 is a block diagram of a system 100 configured to generate a three-dimensional (3D) model based on a sequence of image frames. For example, the system 100 may generate a 3D model of an object based on a set of captured images 102. The set of captured images 102 may include a sequence of image frames captured by an image capture device, such as a two-dimensional camera (2D) camera, a 3D camera, a 3D sensor, a depth-sensing camera (e.g., a Red-Green-Blue-Depth (RGB-D) camera), or any other device configured to capture images. In alternative implementations, multiple cameras may be used by the image capture device to obtain the set of captured images 102. The image capture device may be associated with a display 104 which may present (e.g., visually display) a representation of a 3D model based on the captured images 102. The displayed representation of the 3D model may be configured to enable a user to correct or enhance the 3D model after initial generation of the 3D model.

The captured images 102 may include multiple images (e.g., two-dimensional images, 3D images, image data, etc.) representative of a scene. For example, the scene may include one or more objects as well as background or other context of the one or more objects. In a particular implementation, one or more of the captured images 102 may be represented via the display 104. For example, as a user captures images of the scene using a camera, the display 104 (and/or another user interface, such as a projector) may present the images to the user. Additionally, the display 104 (and/or another user interface, such as a keypad or a button) may be configured to enable the user to provide input related to the images. For example, the display 104 may receive a user selection 106. The user selection 106 may enable the user to select a region of interest that includes a particular object within the scene.

The user selection 106 may include information specifying a bounding box around a particular object within the scene. The bounding box may correspond to a region of interest defined by the user. The region of interest may be displayed relative to one or more of the captured images at the display 104. A region of interest defined by the user may be used by the system 100 to determine a bounding box, at 108. The bounding box may be associated with the object in a three-dimensional model (e.g., a two-dimensional representation of the object) based on the captured images 102. For example, the bounding box may include or correspond to the region of interest based on object tracking as the camera moves relative to the object.

In a particular implementation, the bounding box may correspond to a cube or other geometric region in three dimensions that corresponds to or includes a portion (e.g., a volume) of the region of interest defined by the user via the display 104. As the camera continues to capture images, an object tracking module 112 may be used to track the region of interest or an object corresponding to the region of interest from one image frame to subsequent image frames. Based on the object tracking, the bounding box may be updated, at 110. For example, during generation of the three-dimensional model when the camera moves closer to or further from the object, a size parameter of the bounding box may be adjusted based on the object tracking. The bounding box may be associated with multiple size parameters (e.g., (x, y, z) dimension parameters, a center point (x, y, z) coordinate and a spherical radius, etc.). A particular size parameter may be associated with or correspond to a particular dimension of the bounding box (e.g., length, width, or depth). The value of the size parameter may be adjusted based on determining that the object is larger or smaller in the bounding box in one image than in a previous image.

In another example, a value of a position parameter of the bounding box may be adjusted based on tracking the object within the bounding box at the object tracking module 112. To illustrate, the object may move from image frame to image frame in the set of captured images 102 based on movement of the object relative to the scene or movement of the object relative to the camera. The value of the position parameter may be adjusted based on the relative position of the object in the sequence of images.

The sequence of images may be used to determine camera poses 113 (e.g., camera pose data). For example, the object tracking module 112 may be configured to determine a camera pose of the image capture device when the image capture device is associated with a 3D scan of an object. To illustrate, the object tracking module 112 may be configured to predict a camera pose of the image capture device using a prediction module to generate pose prediction data based on one or more of the image frames. The object tracking module 112 may also be configured to measure the camera pose to generate pose measurement data. Additionally, the object tracking module 112 may be configured to update the prediction module based on the pose prediction data and the pose measurement data.

The camera poses 113, the object tracking module 112, or both, may be used to determine a device speed. For example, during generation of the captured images 102, a device speed check unit 114 may determine a speed of the image capture device relative to the object based on a plurality of camera poses, based on a plurality of timestamps associated with the camera poses, or both. For example, the speed may be determined based on a calculation of a relative position of a camera corresponding to each camera pose and a timestamp associated with the camera pose. When the speed satisfies a speed threshold, a notification may be presented via the display 104.

In some implementations, the speed may satisfy the speed threshold when the speed is greater than or equal to the speed threshold. In an alternative implementation, the speed may satisfy the speed threshold if the speed is within a range of speeds that correspond to the speed threshold. In some implementations, the notification may suggest that the speed of the image captured device should be reduced because the speed is greater than or equal to the speed threshold. For example, the speed may be reduced in order to reduce errors or to enable more images to be captured within a particular space in order to improve 3D model generation. In another implementation, the speed may satisfy the speed threshold when the speed is less than or equal to the speed threshold. For example, the speed may be increased to reduce the number of redundant images being captured or to utilize additional processing capacity. Further, if the speed is less than or equal to a second speed threshold for a period of time, a notification may be presented via the display 104, and the capture of the sequence of image frames may be paused. For example, the second speed threshold and time may indicate a lack of movement (e.g., the camera is not moving or is relatively still). Capturing of the sequence of image frames may be resumed or reinstated when the camera resumes movement.

Thus, the device speed check unit 114 may calculate a speed associated with movement of the image capture device relative to the object and may selectively output a notification via the display 104 based on a comparison of the relative speed of movement of the image capture device to the speed threshold. In response to determining that the speed satisfies the speed threshold, the system 100 may pause capturing of a sequence of images while the notification is provided to the user.

The camera poses 113 may also be used by the 3D model generation unit 115 to generate a 3D model (e.g., an initial 3D model or a "point cloud"). An anomaly detection unit 116 may analyze the 3D model to determine whether the 3D model includes an anomaly (e.g., a discontinuity of a surface, a missing or incomplete region, etc.). If the anomaly detection unit 116 detects an anomaly in the 3D model, the anomaly detection unit 116 may cause the display 104 to display an indicator that identifies a location of the anomaly in the 3D model. Alternatively, the indicator may be presented via another user interface (e.g., audio speaker, light emitting diode (LED), etc.). The anomaly detection unit 116 may also provide the 3D model (or data representing the 3D model) to a 3D model optimizer 118.

The 3D model optimizer 118 or the anomaly detection unit 116 may cause the display 104 to present one or more selectable options to enable correction of the anomaly. In some implementations, the options are selectable via a display (e.g., the display 104). In other implementations, the options are selectable via one or more other user interfaces (e.g., a speaker, a microphone, a keypad, etc.). The options may include an option to activate a refiner unit 120 to enable the system 100 to capture additional images in order to correct the anomaly. The options may also include an option to activate a hole filler unit 122 to automatically generate fill data (e.g., based on a hole filling algorithm). If the refiner unit 120 is used to capture additional images, the additional images may be added to the captured images 102 to be processed by other units of the system 100 to generate a new or updated 3D model, which may also be analyzed by the anomaly detection unit 116.

The 3D model optimizer 118 may be configured to correct pixel values associated with a 3D scan of an object. For example, the 3D model optimizer 118 may be configured to scan a sequence of image frames captured by the image capture device at different 3D viewpoints. The 3D model optimizer 118 may also be configured to generate a composite confidence map based on the sequence of image frames. The composite confidence map may include pixel values for scanned pixels in the sequence of image frames. The 3D model optimizer 118 may further be configured to identify occluded pixels (e.g., "holes") from the sequence of image frames and to assign pixel values to each occluded pixel based on the composite confidence map. Additional details corresponding to the pixel value correction techniques are described with respect to FIGS. 8-11.

The 3D model optimizer 118 may generate an enhanced 3D model (e.g., enhanced model data), which may be provided to the display 104. The enhanced 3D model may also be provided to a color correction unit 124, to a texture mapping unit 126, or to both, to perform color, light, and/or texture corrections based on the captured images 102 in the 3D model to further refine the 3D model for display at the display 104. The enhanced 3D model includes more details than the 3D model generated during the capture of the sequence of images. For example, the more details may include higher resolution, improved color mapping, smooth textures, smooth edges, etc. In some implementations, the texture mapping unit 126 may configured to perform the pixel correction techniques described above with respect to the 3D model optimizer 118.

The texture mapping unit 126 may be configured to assign texture coordinates to a 2D representation of an object. For example, the texture mapping unit 126 may be configured to generate multiple triangles based on different 3D viewpoints of the object. Each triangle is used to construct a three-dimensional model of the object. According to some implementations, the 3D viewpoints are associated with a 3D scan of the object and each triangle corresponds to a different portion of the object. The texture mapping unit 126 may be configured to classify each triangle associated with only one three-dimensional viewpoint as a non-occluded triangle and to classify each triangle that is not associated with only one three-dimensional viewpoint as an occluded triangle. The texture mapping unit 126 may further be configured to arrange the occluded triangles in a row-column format and to assign texture coordinate values to the occluded triangles.

The texture mapping unit 126 and/or the color correction unit 124 may be configured to determine a color of a texture pixel associated with a 3D scan of an object. For example, the units 124, 126 may be configured to prioritize a sequence of image frames (captured from an image capture device) in a queue. The sequence of image frames may be prioritized based on one or more prioritization parameters, as described below. The units 124, 126 may also be configured to select a first image frame from the queue. The first image frame may depict a particular texture pixel from a first angle. The units 124, 126 may also be configured to determine a pixel value of the particular texture pixel in the first image frame. The units 124, 126 may further be configured to select a second image frame from the queue. The second image frame may depict the particular texture pixel from a second angle. The second image frame may have a higher priority than the first image frame based on the one or more prioritization parameters. The units 124, 126 may also be configured to modify the pixel value of the particular texture pixel based on a pixel value of the particular texture pixel in the second image frame to generate a modified pixel value of the particular texture pixel. Additional details corresponding to the texture pixel color determination techniques are described with respect to FIGS. 5-7.

The texture mapping unit 126 and/or the color correction unit 124 may be configured to adjust pixel colors between image frames associated with a 3D scan of an object. For example, the units 124, 126 may be configured to scan a first image frame of a sequence of image frames and to determine a grayscale threshold based on characteristics of the first image frame to identify gray pixel candidates in the first image frame. The units 124, 126 may also be configured to adjust a pixel value of each pixel in the first image frame based on a chromatic adaptation transform estimation. The chromatic adaptation transform estimation may be based on a mean pixel value determination associated with the gray pixel candidates. Additional details corresponding to the adjusting pixel colors between image frames techniques are described with respect to FIGS. 3 and 4.

The system 100 of FIG. 1 may enhance 3D model generation of an object. For example, components of the system 100 may improve camera pose estimation associated with scanning the object for 3D model generation, adjust pixel colors between image frames used to generate the 3D model, and modify pixel values of texture pixels of the 3D model.

Figure 2:
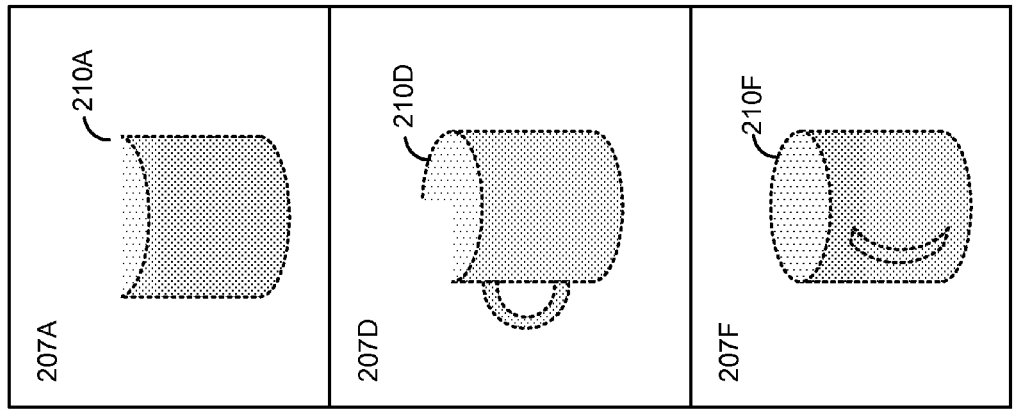
FIG. 2 is a diagram that illustrates a plurality of camera poses.
Figure 2:
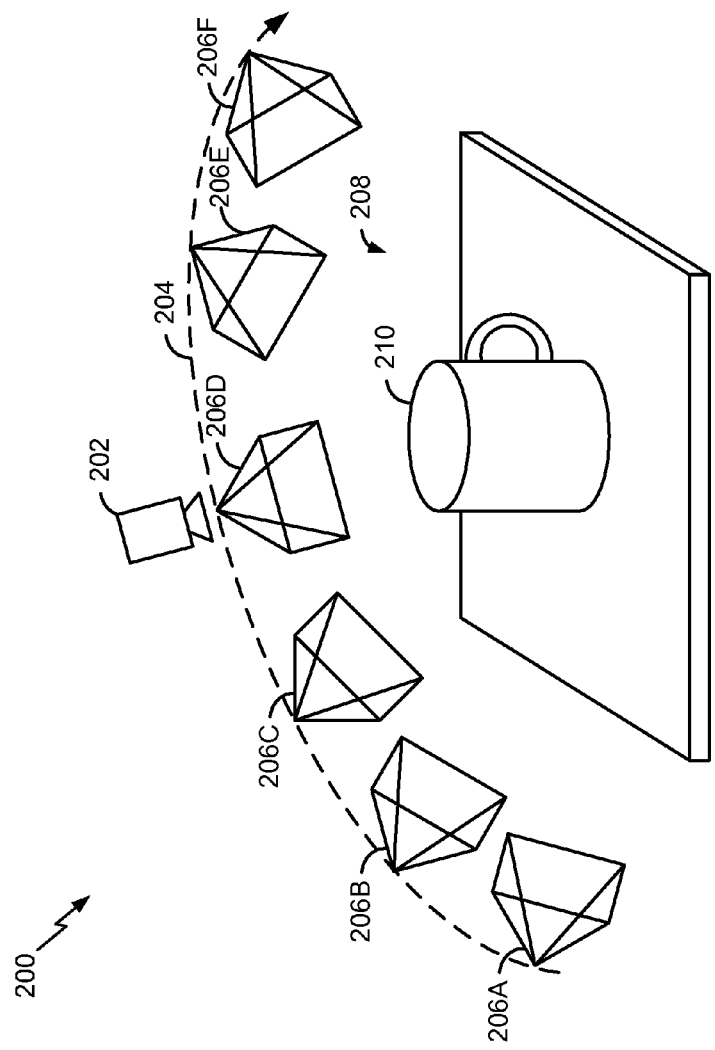

Referring to FIG. 2, an illustrative implementation of operation of the system 100 of FIG. 1 is shown and generally designated 200. In FIG. 2, an image capture device 202 (e.g., a two-dimensional camera, a depth sensing camera, a three-dimensional camera, etc.) is moved along a path 204 (e.g., an arc) relative to an object 210, such as a cup as shown in FIG. 2. During the movement of the image capture device 202 along the path 204, the image capture device 202 is located at various positions and orientations illustrated in FIG. 2 by camera poses 206A, 206B, 206C, 206D, 206E, and 206F. The camera poses 206A-F correspond to image capture operations that generate image frames in a sequence of image frames captured by the image capture device 202. It should be noted that the number, separation, and orientation of the camera poses 206A-F shown in FIG. 2 are shown for illustration only, and are not to be considered limiting.

For example, more camera poses or fewer camera poses may be used with different intervals between consecutive (or adjacent) camera poses.

The path 204 may be of any configuration, based on how the image capture device 202 is moved around the object 210. As the image capture device 202 is moved along the path 204 from a position associated with the camera pose 206A to a position associated with the camera pose 206F, a 3D point cloud of the object 210 may be generated in real time or near-real time based on the camera poses 206A-F and the sequence of image frames. For example, at the camera pose 206A, which represents an initial camera pose of the image capture device 202 at a first position along the path 204, a first partial 3D point cloud 210A may be generated at the image capture device 202, as shown at 207A. As the image capture device 202 continues to move along the path 204, additional data may be captured and used to add points to the partial 3D point cloud. For example, when the image capture device 202 has moved along the path 204 to a position associated with the camera pose 206D, a more complete 3D point cloud 210D may be generated, as shown at 207D. After the image capture device 202 reaches a position associated with the camera pose 206F, a completed 3D point cloud 210F may be generated, as shown at 207F.

Although FIG. 2 is described with respect to the image capture device 202 moving along the path 204 to capture image frames of a stationary object, in other implementations, the object (or a scene that includes the object) may move relative to a stationary image capture device (e.g., a fixed camera) to generate image frames. In other implementations, the object and the image capture device 202 may both move during generation of the image frames.

Figure 3:
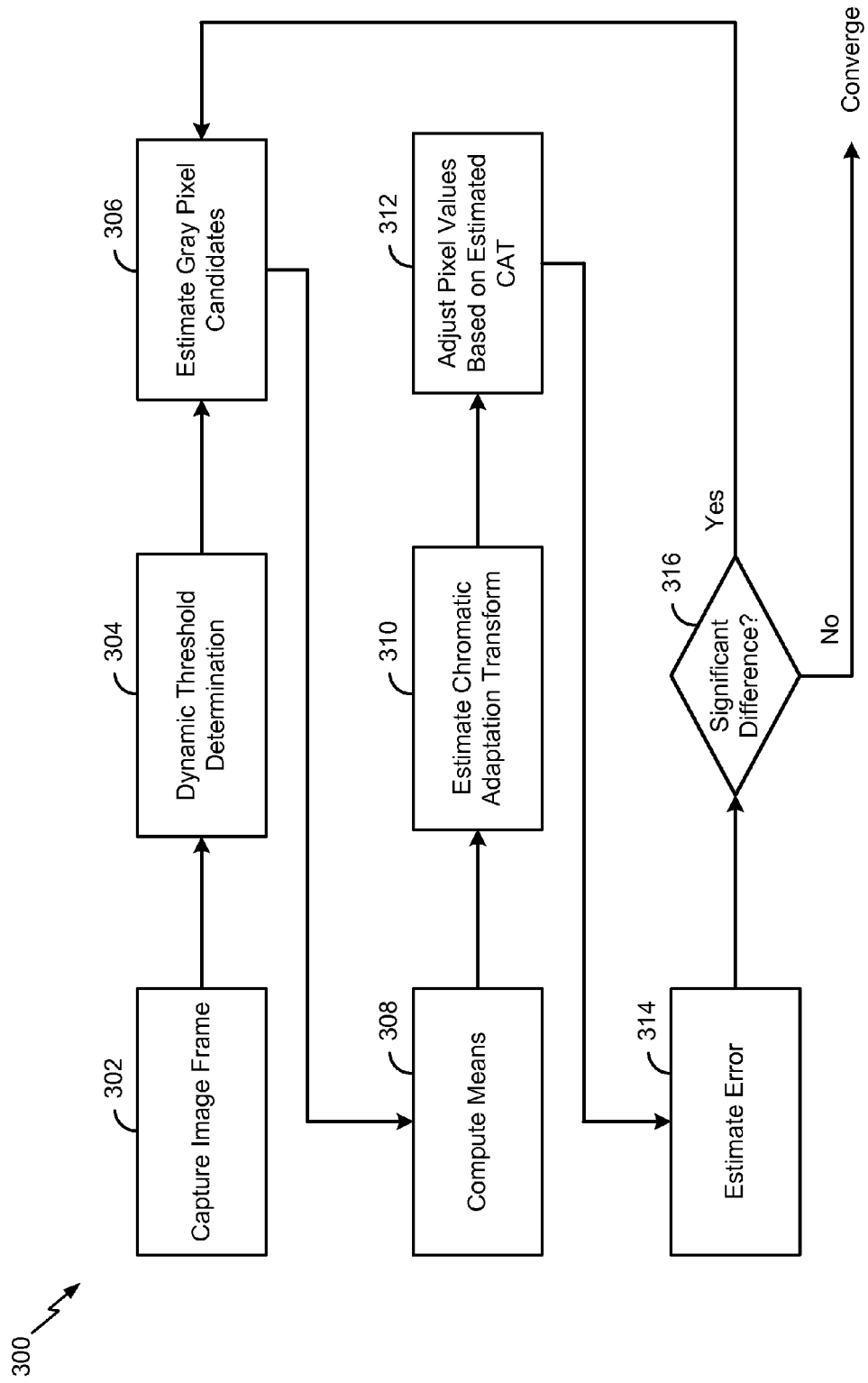
FIG. 3 is a process diagram for adjusting pixel colors between image frames that are associated with a 3D scan of an object.

Referring to FIG. 3, a process diagram 300 for adjusting pixel colors between image frames that are associated with a 3D scan of an object is shown. The process diagram 300 may be implemented using the texture mapping unit 126 of FIG. 1, the color correction unit 124 of FIG. 1, the image capture device 202 of FIG. 2, or a combination thereof.

According to the process diagram 300, the image capture device 202 may capture an image frame, at 302. For example, the image capture device 202 may capture a first image frame when the image capture device 202 is at camera pose 206A. A processor (e.g., the texture mapping unit 126 and/or the color correction unit 124) may scan the first image frame and may dynamically determine a grayscale threshold (e.g., a value less than one) based on characteristics (e.g., statistics) of the first image frame, at 304.

According to some implementations, the processor may determine a color cast of the first image frame based on first chrominance component values (e.g., U-channel values in a YUV space) for slightly off gray points in the first image frame and based on second chrominance component values (e.g., V-channel values in the YUV space) for slightly off gray points in the first image frame. For example, a positive average for the first chrominance component values and a negative average for the second chrominance component values may indicate a "cooler" cast/temperature. A negative average for the first chrominance component values and a positive average for the second chrominance component values may indicate a "warmer" cast/temperature. When the averages of the first and second chrominance component values are relatively close to zero, the first image frame may be a "neutral" image frame (e.g., an image frame having neither a warm nor cool cast). The processor may dynamically determine the grayscale threshold based on the color cast of the first image frame. For example, the processor may select a grayscale threshold that at least partially offsets (e.g., counters) the color cast of the first image frame.

According to another implementation, the processor may determine (e.g., estimate) the color cast of the first image frame using a histogram to measure the proportion of slightly off gray points in the "yellow range" to slightly off gray points in the "blue range". For example, the processor may determine a color cast of the first image frame based on a histogram indicating a proportion of off-gray points having a yellow-based tint to off-gray points having a blue-based tint. The processor may determine the grayscale threshold based on the color cast of the first image frame. For example, a greater proportion of off-gray points having a yellow-based tint may indicate a warmer cast/temperature, and a greater proportion of off-gray points having a blue-based tine may indicate a cooler cast/temperature. The processor may dynamically determine the grayscale threshold based on the color cast of the first image frame. For example, the processor may select a grayscale threshold that at least partially offsets (e.g., counters) the color cast of the first image frame.

Both implementations may result in relatively fast processing speeds for estimating the color cast based on off-gray points (e.g., off-gray pixels) as opposed to averaging chrominance components values for each pixel in the first image frame. Additionally, determining the color cast based on off-gray points may improve accuracy because gray points provide a better estimate about the color cast than a determination based on every pixel in an image frame. Determining the color cast based on off-gray points may also provide a better estimate of the color cast than a determination based on pixels in a region of interest (ROI) of the image frame.

The processor may estimate gray pixel candidates, at 306. For example, the processor may compare a first chrominance value (e.g., the U-channel value) and a second chrominance value (e.g., the V-channel value) for each pixel (or every other pixel for decreased computation, as described below) in the first image frame to the grayscale threshold. If a first chrominance value for a particular pixel and a second chrominance value for the particular pixel satisfy the grayscale threshold, the processor may identify the particular pixel as a gray pixel candidate.

The processor may determine (e.g., compute) a mean pixel value based on the first chrominance component values (e.g., the U-channel values) and based on the second chrominance component values (e.g., the V-channel values) of each of the gray pixel candidates, at 308. The processor may estimate a chromatic adaptation transform (CAT) between the computed mean pixel values of the gray pixel candidates and a pixel value corresponding to a reference white light, at 310. For example, a transformation matrix (M) corresponding to the CAT may be estimated (e.g., determined) using the computed mean pixel values of the gray pixel candidates and a pixel value corresponding to a reference white light.

The processor may adjust a pixel value of each pixel in the first image frame based on the CAT estimation (e.g., based on the transformation matrix (M)), at 312. For example, the transformation matrix (M) may be used to adjust (e.g., shift) each pixel in the first image frame (e.g., a current illuminant) to a neutral illuminant. Adjusting each pixel based on the transformation matrix may be expressed as $$\begin{bmatrix} X_D \\ Y_D \\ Z_D \end{bmatrix} = [M] \begin{bmatrix} X_S \\ Y_S \\ Z_S \end{bmatrix}.$$

Thus, using the CAT to adjust each pixel in the first image frame may substantially reduce (e.g., remove, offset, counter, etc.) the color cast/temperature of the first image frame.

The processor may also be configured to implement early termination criteria by estimating an error based on a comparison of chrominance component value averages with previous chrominance component value averages, at 314. For example, in order to avoid redundant iterations, the processor may measure the "improvement" in the first image frame after each iteration. To illustrate, the processor may store the means of the first chrominance component values ($U_P$) (e.g., the U-channel values) and the second chrominance component values ($V_P$) (e.g., the V-channel values) of the gray pixel candidates from the previous iteration (p). The processor may measure the Euclidian distance of the chrominance component values ($U_P$), ($V_P$) from the means of the first and second chrominance component values ($U_C$), ($V_C$) of the current iteration (c). For example, the error (e) be expressed as $e=\sqrt{\Delta U^2 + \Delta V^2}$, where $\Delta=U=U_c-U_p$, and where $\Delta V=V_c-V_p$.

If the error (e) is not significant (e.g., if the error is less than a convergence threshold), the adjusted pixel values are considered to have converged to accurate values and may be used, at 316. Otherwise, if the error is significant, the process returns to 306 where gray pixel candidates are again estimated based on the adjusted pixel values. Thus, the processor may determine a difference between the CAT estimation and a preceding CAT estimation associated with a preceding iteration and may compare the difference to the convergence threshold. If the difference fails to satisfy the convergence threshold, the processor may shift a pixel value in a subsequent iteration based on the CAT estimation. If the difference satisfies the convergence threshold, the processor may determine a subsequent grayscale threshold based on characteristics (e.g., statistics) of the subsequent iteration, use the subsequent grayscale threshold to identify gray pixel candidates in the subsequent iteration, and adjust a pixel value of each pixel in the subsequent iteration based on a subsequent CAT estimation.

The process flowchart 300 of the FIG. 3 may enable accurate color cast/temperature estimation by dynamically estimating the grayscale threshold for each image frame based on statistics of each image frame. Dynamically estimating the grayscale threshold may also reduce manual tuning for a grayscale threshold. Using the early termination criteria may additionally improve processing speed. According to some implementations, processing speed may further be improved by scanning alternate pixels based on a "checker-board" pattern for gray pixel candidates. Scanning alternate pixels may reduce computation by approximately half while substantially preserving the quality of conversion.

Figure 4:
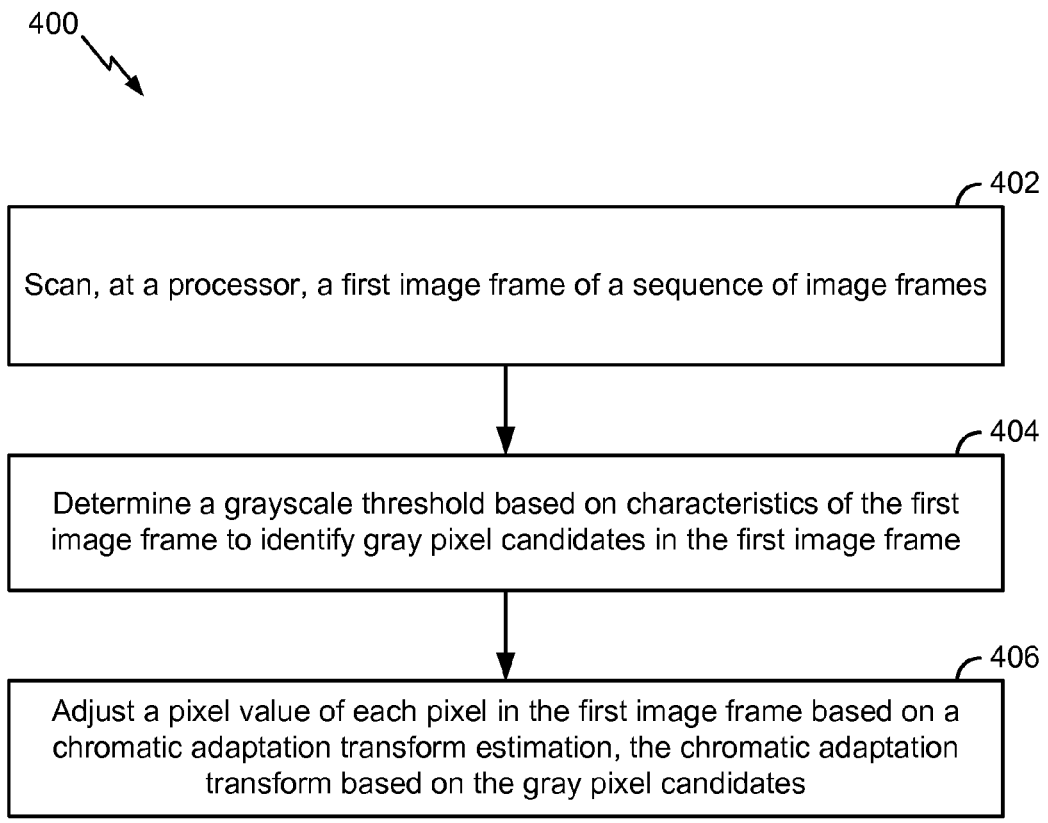
FIG. 4 is a flow diagram of a method for adjusting pixel colors between image frames that are associated with a 3D scan of an object.

Referring to FIG. 4, a method 400 for adjusting pixel colors between image frames that are associated with a 3D scan of an object is shown. The method 400 may be performed by the texture mapping unit 126 of FIG. 1, the color correction unit 124 of FIG. 1, the image capture device 202 of FIG. 2, or a combination thereof.

The method 400 includes scanning, at a processor, a first image frame of a sequence of image frames, at 402. For example, referring to FIGS. 2 and 3, the image capture device 202 may capture a first image frame when the image capture device 202 is at camera pose 206A, and a processor may scan the first image frame.

A grayscale threshold may be determined based on characteristics of the first image frame to identify gray pixel candidates in the first image frame, at 404. For example, referring to FIG. 3, the processor may dynamically determine a grayscale threshold (e.g., a value less than one) based on characteristics (e.g., statistics) of the first image frame. The processor may compare a first chrominance value (e.g., the U-channel value) and a second chrominance value (e.g., the V-channel value) for each pixel (or every other pixel) in the first image frame to the grayscale threshold. If a first chrominance value for a particular pixel and a second chrominance value for the particular pixel satisfy the grayscale threshold, the processor may identify the particular pixel as a gray pixel candidate.

A pixel value of each pixel in the first image frame may be adjusted based on a CAT estimation, at 406. The CAT estimation may be based on the gray pixel candidates. According to one implementation, the CAT estimation may be based on a mean pixel value determination of the gray pixel candidates. For example, referring to FIG. 3, the processor may adjust a pixel value of each pixel in the first image frame based on the CAT estimation (e.g., based on the transformation matrix (M)). The transformation matrix (M) may be used to adjust (e.g., shift) each pixel in the first image frame (e.g., a current illuminant) to a neutral illuminant.

According to some implementations, the method 400 may include determining a color cast of the first image frame based on first chrominance component values for each off-gray point in the first image frame and second chrominance component values for each off-gray point in the first image frame. The method 400 may also include determining the grayscale threshold based on the color cast of the first image frame. The grayscale threshold may at least partially offset (e.g., counter) the color cast of the first image frame.

According to some implementations, the method 400 may include determining a color cast of the first image frame based on a histogram indicating a proportion of off-gray points having a yellow-based tint to off-gray points having a blue-based tint. The method 400 may also include determining the grayscale threshold based on the color cast of the first image frame.

According to some implementations, identifying the gray pixel candidates may include comparing a first chrominance component value and a second chrominance component value for each pixel in the first image frame to the grayscale threshold. A particular pixel in the first image frame may be identified as a gray pixel candidate if a first chrominance component value for the particular pixel and a second chrominance value for the particular pixel satisfy the grayscale threshold.

According to some implementations, the method 400 may include determining a mean pixel value based on a first chrominance component value and a second chrominance component value of each of the gray pixel candidates. The method 400 may also include estimating a CAT between the mean pixel value and a pixel value corresponding to a reference white light.

According to some implementations, the method 400 may include determining a difference between the CAT estimation and a preceding CAT estimation associated with a preceding iteration. The difference may be compared to a convergence threshold. A pixel value in a subsequent iteration may be adjusted (e.g., shifted) based on the CAT estimation if the difference fails to satisfy the convergence threshold. If the difference satisfies the convergence threshold, the method 400 may include determining a subsequent grayscale threshold based on characteristics (e.g., statistics) of the subsequent iteration. The subsequent grayscale threshold may be used to identify gray pixel candidates in the subsequent iteration, and a subsequent CAT estimation may be used to adjust a pixel value of each pixel in the subsequent iteration.

The method 400 of FIG. 4 may enable accurate color cast/temperature estimation by dynamically estimating the grayscale threshold for each image frame based on statistics of each image frame. Dynamically estimating the grayscale threshold may also reduce manual tuning for a grayscale threshold. Using the early termination criteria may additionally improve processing speed.

Figure 5:
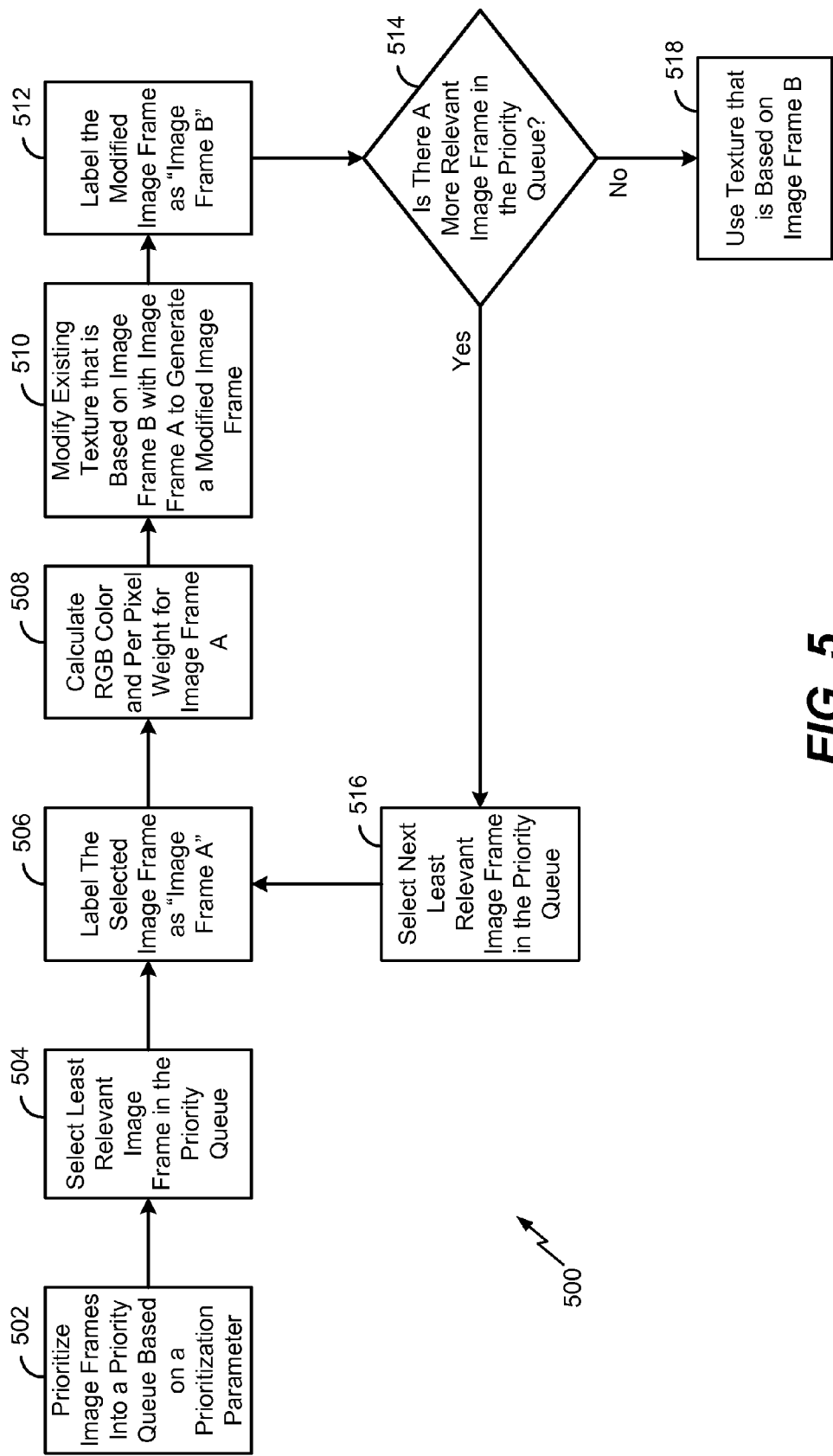
FIG. 5 is a process diagram for determining a pixel value of a texture pixel associated with a 3D scan of an object.
Figure 6:
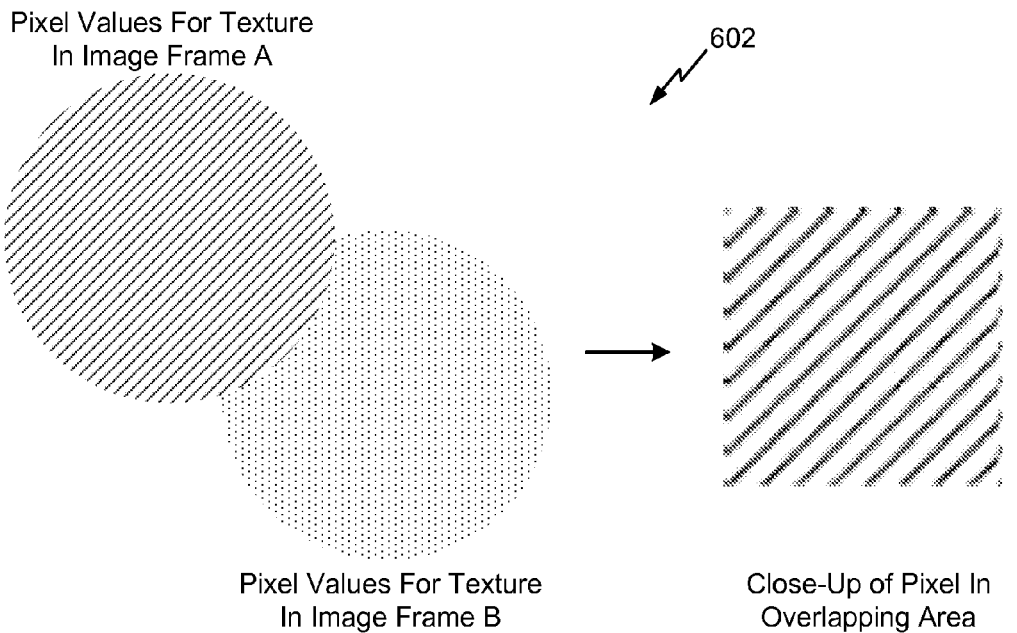
FIG. 6 illustrates examples of modifying a pixel value of a texture pixel based on techniques described with respect to FIG. 5.
Figure 6:
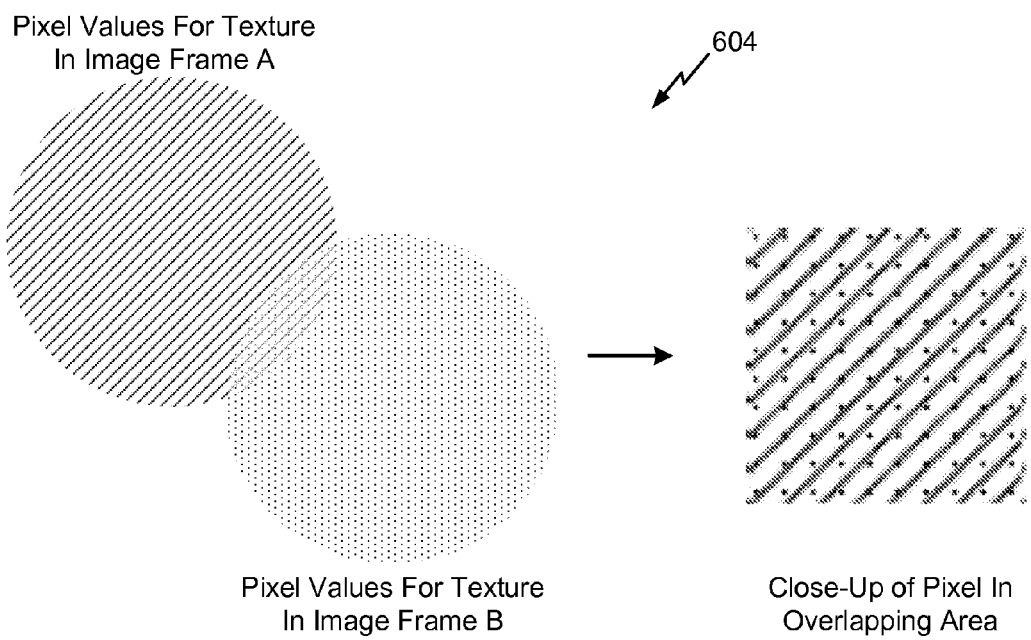

Referring to FIGS. 5 and 6, a process diagram 500 for determining a color of a texture pixel associated with a 3D scan of an object is shown. Operations illustrated in the process diagram 500 may be implemented using the texture mapping unit 126 of FIG. 1, the color correction unit 124 of FIG. 1, or a combination thereof. FIG. 6 depicts examples of determining textures.

According to the process diagram 500, a processor (e.g., the texture mapping unit 126 and/or the color correction unit 124) may prioritize image frames into a queue (e.g., a priority queue) based on one or more prioritization parameters, at 502. For example, the processor may store image frames into the queue in an order that places the "least relevant" image frame at the top of the queue and places the "most relevant" image frame at the bottom of the queue. The prioritization parameters may include an image frame timestamp weight, an image frame blur weight, an image frame color shift weight, an image frame face weight, an image frame distance weight, an image frame validity weight, one or more other parameters, or a combination thereof.

According to the image frame timestamp weight prioritization parameter, image frames captured first may be assigned a higher priority (e.g., assigned a higher image priority value) than image frames captured later. Thus, an image frame captured first may be stored at the bottom of the queue, and the last image frame captured may be stored at the top of the queue. To illustrate, an image frame captured when the image capture device 202 of FIG. 2 is at the camera pose 206A may be relatively close to the bottom of the queue, and an image frame captured when the image capture device 202 is at the camera pose 206F may be at the top of the queue.

The first image frame captured may have a high priority because the first image frame captured may be focused on the object and/or may capture "important" features of the object (e.g., a person's face). Image frames captured after the first image frame may have a lower priority. For example, image frames captured after the first image frame may have reduced focus quality, reduced resolution, and/or quality defects due to movement blur.

According to the image frame blur weight prioritization parameter, image frames having a relatively low degree of blurriness may be assigned a higher priority than image frames having a relatively high degree of blurriness. Thus, an image frame having a relatively low degree of blurriness may be stored relatively close to the bottom of the queue, and an image frame having a relatively high degree of blurriness may be stored relatively close to the top of the queue. According to the image frame color shift weight prioritization parameter, image frames having a relatively small amount of color correction applied may be assigned a higher priority than image frames having a relatively large amount of color correction applied. Thus, an image frame having a relatively small amount of color correction applied may be stored relatively close to the bottom of the queue, and an image frame having a relatively large amount of color correction applied may be stored relatively close to the top of the queue.

According to the image frame face weight prioritization parameter, image frames depicting a relatively large portion of a detected face from a frontal perspective (based on facial landmark tracking) may be assigned a higher priority than image frames depicting a relatively small portion of the face (or from perspectives other than the frontal perspective). Thus, an image frame depicting a relatively large amount of a person's face from the frontal perspective may be stored relatively close to the bottom of the queue, and an image frame depicting a relatively small amount of the face from the frontal perspective may be stored relatively close to the top of the queue. According to the image frame distance weight prioritization parameter, image frames captured from a relatively close distance to the object may be assigned a higher priority than image frames captured from a relatively far distance from the object. Thus, an image frame captured from a relatively close distance to the object may be stored relatively close to the bottom of the queue, and an image frame captured from a relatively far distance from the object may be stored relatively close to the top of the queue. According to the image frame validity weight (e.g., outlier weight) prioritization parameter, an image frame determined invalid based on any other prioritization parameter may be filtered out and excluded from the texture mapping process.

In some implementations, an image priority (I) is based on one or more parameters. As an illustrative, non-limiting example, the image priority (I) for a given image frame may be expressed as $I=(W_t*T)+(W_b*B)+(W_c*C)+(W_f*F)+(W_d*D)+V$, where $W_t$ is the weighing factor applied to the image frame timestamp weight (T), where $W_b$ is the weighing factor applied to the image frame blur weight (B), where $W_c$ is the weighing factor applied to the image frame color shift weight (C), where $W_f$ is the weighing factor applied to the image frame face weight (F), where $W_d$ is the weighing factor applied to the image frame distance weight (D), and where (V) is the image frame validity weight. Once the value of the image priority (I) of a particular image frame is determined, the particular image frame may be determined valid if the value is within a determined range. If the value is not within the range, the particular image frame may be discarded.

Although multiple prioritization parameters may be used, for ease of illustration, the following description is based on the image frame timestamp weight prioritization parameter. However, it should be understood than any combination of prioritization parameters may be used in conjunction with one another according to the techniques described herein.

According to the process diagram 500, the processor may select the least relevant image frame in the priority queue, at 504, and may label the selected image frame as "Image Frame A", at 506 to begin an iterative process that adjusts textures that are based on lower-priority image frames in previous iterations (labeled "B") with adjustments based on a higher-priority image frame (labeled "A") in a current iteration. For example, the processor may select the image frame at the top of the queue (e.g., the image frame captured when the image capture device 202 is at the camera pose 206F) and label the selected image frame "Image Frame A". The processor may determine pixel values (e.g., calculate RGB colors) for pixels in Image Frame A and may determine a per pixel weight (e.g., Alpha) for Image Frame A, at 508.

At 510, the processor may modify existing texture pixels of a 3D model based on Image Frame A. For example, the existing texture pixels may be based on a previous image frame (e.g., "Image Frame B") that is "less relevant" than Image Frame A based on the prioritization parameter, or if Image Frame A is the first processed image frame, the texture pixels may be "blank". According to some implementations, modifying an existing texture pixel may include replacing the pixel value of the existing texture pixel in Image Frame B with the pixel value of the existing texture pixel in Image Frame A. An illustrative example 602 of replacing texture pixel values is illustrated in FIG. 6. According to another implementation, modifying the existing texture pixel may include using the alpha (transparency) channel in Image Frame A to blend with the existing texture pixel in Image Frame B. An illustrative example 604 of averaging texture pixel values is also illustrated in FIG. 6.

After modifying the texture pixels, the processor may generate a modified image frame based on the pixel values of the modified texture pixels and label the modified image frame "Image Frame B", at 512. At 514, the processor may determine whether there is a "more relevant" image frame in the queue based on the prioritization parameter. If there is a more relevant image frame, the processor may select the "next least" relevant frame in the queue, at 516, and label the selected frame "Image Frame A", at 506. For example, the processor may select the image frame at the top of the queue (e.g., the image frame captured when the image capture device 202 is at the camera pose 206E) and label the selected image frame "Image Frame A", and the existing texture pixel may be modified in a manner as described above. If there is not a more relevant image frame (e.g., if the processor modified the existing texture pixel based on the image frame captured when the image capture device 202 is at the camera pose 206A), the processor may use the existing texture pixel for the 3D model, at 518.

The process flowchart 500 of FIG. 5 may increase the likelihood that texture pixels in the 3D model are based on the most relevant image frames. For example, selecting different prioritization parameters may enable the processor to generate a 3D model based on image frames having desirable qualities. A non-limiting example may be an image frame that is captured relatively early during the 3D scan of the object.

Figure 7:
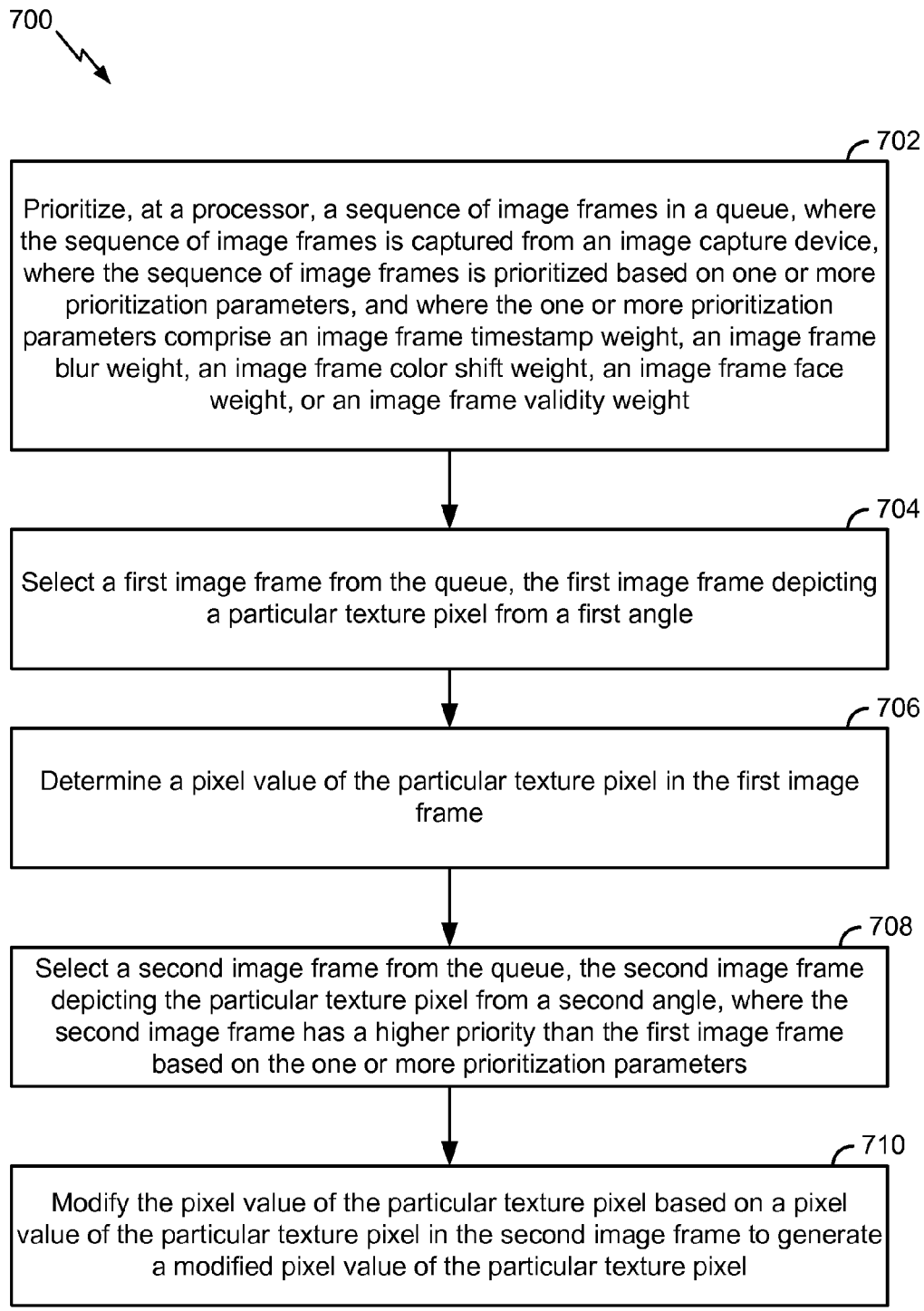
FIG. 7 is a flow diagram of a method for determining a pixel value of a texture pixel associated with a 3D scan of an object.

Referring to FIG. 7, a method 700 for determining a color of a texture pixel associated with a 3D scan of an object is shown. The method 700 may be performed by the texture mapping unit 126 of FIG. 1, the color correction unit 124 of FIG. 1, or a combination thereof.

The method 700 includes prioritizing, at a processor, a sequence of image frames in a queue, at 702. The sequence of image frames may be captured from an image capture device, and the sequence of image frames may be prioritized based on one or more prioritization parameters. The prioritization parameters may include an image frame timestamp weight, an image frame blur weight, an image frame color shift weight, an image frame face weight, an image frame distance weight, an image frame validity weight, or a combination thereof. For example, referring to FIG. 5, the processor may prioritize image frame into a queue (e.g., a priority queue) based on one or more prioritization parameters. The processor may store or assign image frames into positions in the queue in an order that places the "least relevant" image frame at the top of the queue and places the "most relevant" image frame at the bottom of the queue.

A first image frame from the queue may be selected, at 704. The first image frame may depict a particular texture pixel from a first angle. For example, referring to FIG. 5, the processor may select the image frame at the top of the queue (e.g., the image frame captured when the image capture device 202 is at the camera pose 206F) and label the selected image frame "Image Frame A".

A pixel value of the particular texture pixel in the first image frame may be determined, at 706. For example, referring to FIG. 5, the processor may determine pixel values (e.g., calculate RGB colors) for pixels in Image Frame A and may determine a per pixel weight (e.g., Alpha) for Image Frame A.

A second image frame may be selected from the queue, at 708. The second image frame may depict the particular texture pixel from a second angle, and the second image frame may have a higher priority than the first image frame based on the one or more prioritization parameters. For example, referring to FIG. 5, the processor may select the next image frame in the queue (e.g., the image frame captured when the image capture device 202 is at the camera pose 206E).

The pixel value of the particular texture pixel may be modified based on a pixel value of the particular texture pixel in the second image frame to generate a modified pixel value of the particular texture pixel, at 710. For example, referring to FIG. 5, the processor may modify the particular texture pixel based on the pixel value of the particular texture pixel in the image frame captured when the image capture device 202 is at the camera pose 206E.

According to some implementations, the method 700 may include generating a 3D model (e.g., two-dimensional representation) of the object. The particular texture pixel in the 3D model may have the modified pixel value. According to some implementations, modifying the pixel value of the particular texture pixel may include replacing the pixel value of the particular texture pixel in the first image frame with the pixel value of the particular texture pixel in the second image frame. According to another implementation, modifying the pixel value of the particular texture pixel may include averaging the pixel value of the particular texture pixel in the first image frame with the pixel value of the particular texture pixel in the second image frame.

According to another implementation, the method 700 may include selecting another image frame from the queue. The other image frame may have a higher priority than the second image frame based on the one or more prioritization parameters. For example, the other image frame may correspond to the image frame captured when the image capture device 202 is at the camera pose 206A, 206B, 206C, or 206D). The method 700 may also include modifying the modified pixel value based on the pixel value of the particular texture pixel in the other image frame.

The method 700 of FIG. 7 may increase the likelihood that texture pixels in the 3D model are based on the most relevant image frames. For example, selecting different prioritization parameters may enable the processor to generate a 3D model based on image frames having desirable qualities. A non-limiting example may be an image frame that is captured relatively early during the 3D scan of the object.

Figure 8:
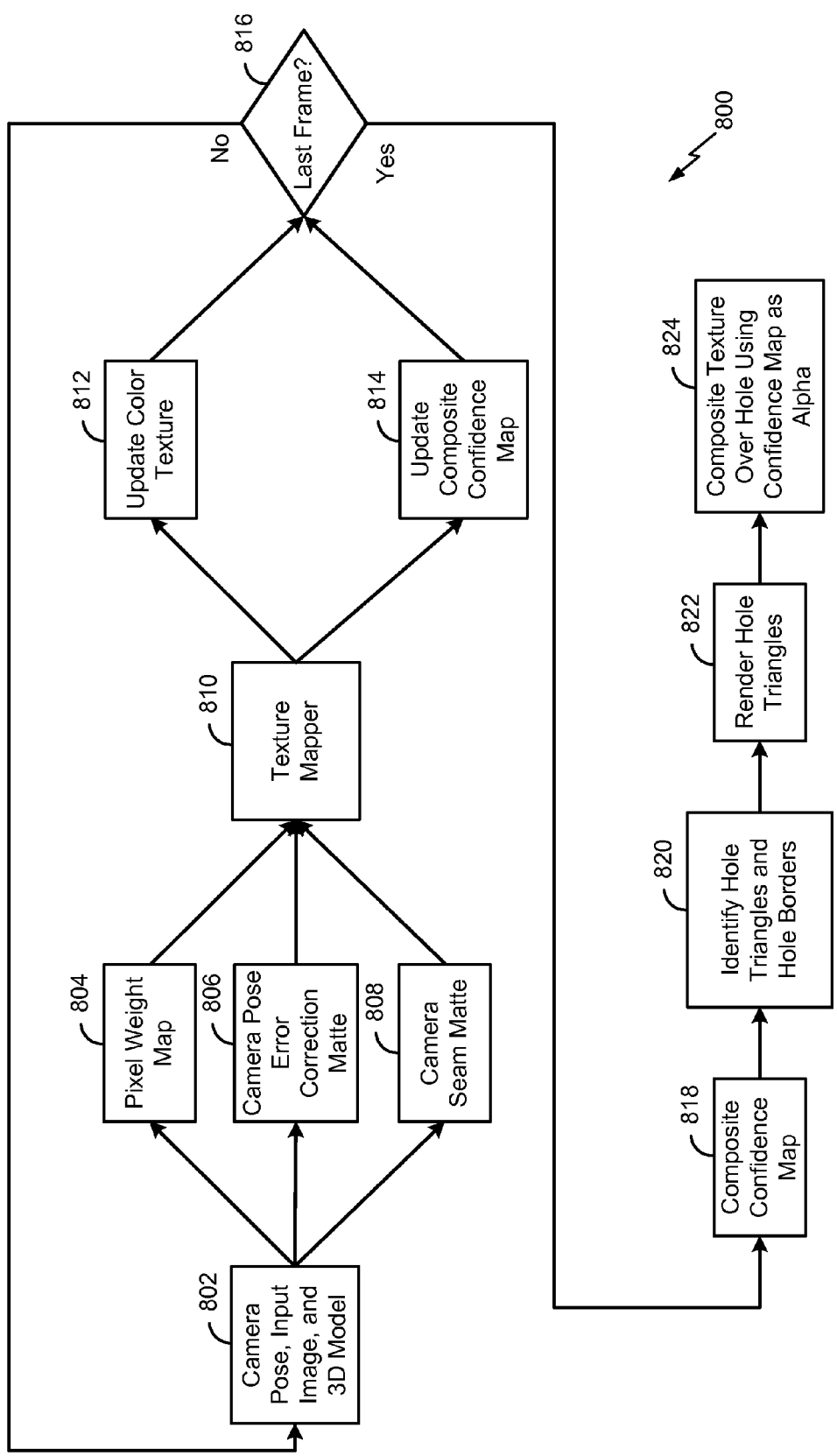
FIG. 8 is a process diagram for correcting pixel values associated with a 3D scan of an object.

Referring to FIG. 8, a process diagram 800 for texture reconstruction and for generating a texture for a 3D model from input images is shown. Operations illustrated in the process diagram 800 may be implemented using the 3D model optimizer 118 of FIG. 1.

If a sequence of image frames is insufficient or inadequate to generate a complete texture mapped 3D model, such insufficiency or inadequacy may go unnoticed until after scanned data collection is complete and data processing begins. For example, the 3D model may include triangles with missing or unassigned texture pixels from its texture map. The missing texture pixels usually (but not always) correspond to portions of the object that were not captured. A texture reconstruction process (e.g., the process of "filling" the texture pixels) may be susceptible to camera seam errors, camera pose and model inaccuracy errors, and unscanned area errors (e.g., "texture holes"). One benefit of the process diagram 800 is to be fault tolerant to the above-identified problems and to produce high quality texture maps with unknown texture areas that are filled with "best guess" estimates. With a robust fault tolerant system, high quality results may be achieved without the need for repeating the capture process.

As used herein, a "hole triangle" corresponds to a triangle in a 3D model with one or more missing texture pixel values. For example, texture pixels may be applied to the triangles of the 3D model to generate an accurate 3D representation of the object 210 of FIG. 2. According to the process diagram 800, a processor (e.g., the 3D model optimizer 118) may determine a camera pose, identify a corresponding image frame, and generate a 3D model based on the camera pose and the image frame. The generated 3D model, the set of camera poses, and the set of camera images may be used as an input, at 802.

The processor may generate a pixel weight map, at 804, to determine a confidence of a particular pixel value in the image frame based on the camera pose. The processor may also generate a camera pose error correction matte, at 806. The camera pose error correction matte may indicate a boundary that "defines" the object (e.g., the cup in FIG. 2) in the 3D model from the background (e.g., a "wall" or anything that the user wants to erase from the 3D model). Because the input camera positions and orientation (e.g., poses) may be mathematically inaccurate (or because the 3D model may include inaccuracies), the camera input image may not align properly with the 3D model for a given camera pose. Poor (e.g., low) quality texture map reconstruction and incorrect pixel values may be a result of the camera input image not aligning properly with the 3D model. A texture mapper, at 810, may use the camera pose error correction matte to avoid using pixels from the camera input image that may adversely contribute to the texture map pixel values.

The processor may also determine a camera seam matte, at 808. The camera seam matte may indicate "holes" where the camera is cut off. The camera seam matte may enable a "gradual falloff" and/or a relatively smooth blending of the pixels located relatively close to the edges of the image frame. Thus, the camera seam matte may reduce the likelihood of an "abrupt change" between "valid" camera pixels and "invalid" (e.g., non-existent) pixels. The texture mapper, at 810, may use the camera seam error matte to avoid using pixels from the camera input image that may adversely contribute to the texture map pixel values.

The pixel weight map, the pose error correction matte, and the camera seam matte may be provided to the texture mapper, at 810. The texture mapper may determine a color (e.g., a pixel value) for a particular pixel in a particular triangle (used for a three-dimensional model of the object) based on the camera pose. The processor may update the color texture for the texture pixel corresponding to the particular pixel, at 812. The processor may also update a composite confidence map, at 814. The composite confidence map may "build up" the pixel value weight for each pixel based on previous iterations (e.g., previous camera poses). Thus, the composite confidence map may be based on 3D camera information associated with each captured image frame. The composite confidence map may also be based on a rendering of a depth-culled depth buffer from the 3D camera's point of view. The rendering may display non-occluded texture pixels, and thus may not erroneously assign a color to an occluded texture pixel.

At 816, the processor may determine if there is another image frame to be processed for the 3D model. If there is another image frame to be processed, the other image frame may be processed, the texture pixels may be updated, and the composite confidence map may be updated based on the above-described techniques. If there is not another image frame to be processed, the processor may generate a "final" composite confidence map, at 818, based on the latest update. The final composite confidence map may include information (e.g., a "summary") of all the pixels from each camera pose.

The processor may use the final composite confidence map to identify texture holes and to identify any corresponding hole borders, at 820. Triangles of the 3D model corresponding to the identified texture holes may be rendered, at 822, and the triangles may be filled using the composite confidence map as an input channel (e.g., alpha), at 824. For example, the processor may use a texture coordinate value for each vertex to "look up" the value in the final composite confidence map. A black value for a vertex may indicate that a corresponding triangle is a hole, and a "gray" value (e.g., a value within a range of grays) for a vertex may indicate that a corresponding triangle is a hole border vertex. White values or bright gray values may indicate that the triangle is neither a hole nor a hole border vertex. For hole border vertices, the color may be used as a color-per-vertex value to render the hole-filling triangle, at 822. To render a hole-filling triangle, a search of the nearest border vertices in a 3D world space may be performed, and the colors of the nearest border vertices are used to render the color-per-vertex hole-filling triangle.

The process diagram 800 may enable un-scanned areas and "aggressively" erased areas of the object to be "filled in" at corresponding triangles of the 3D model based on the final composite confidence map. Filling in the corresponding triangles based on the final composite confidence map may generate 3D model of an object having a relatively high degree of accuracy.

Figure 9:
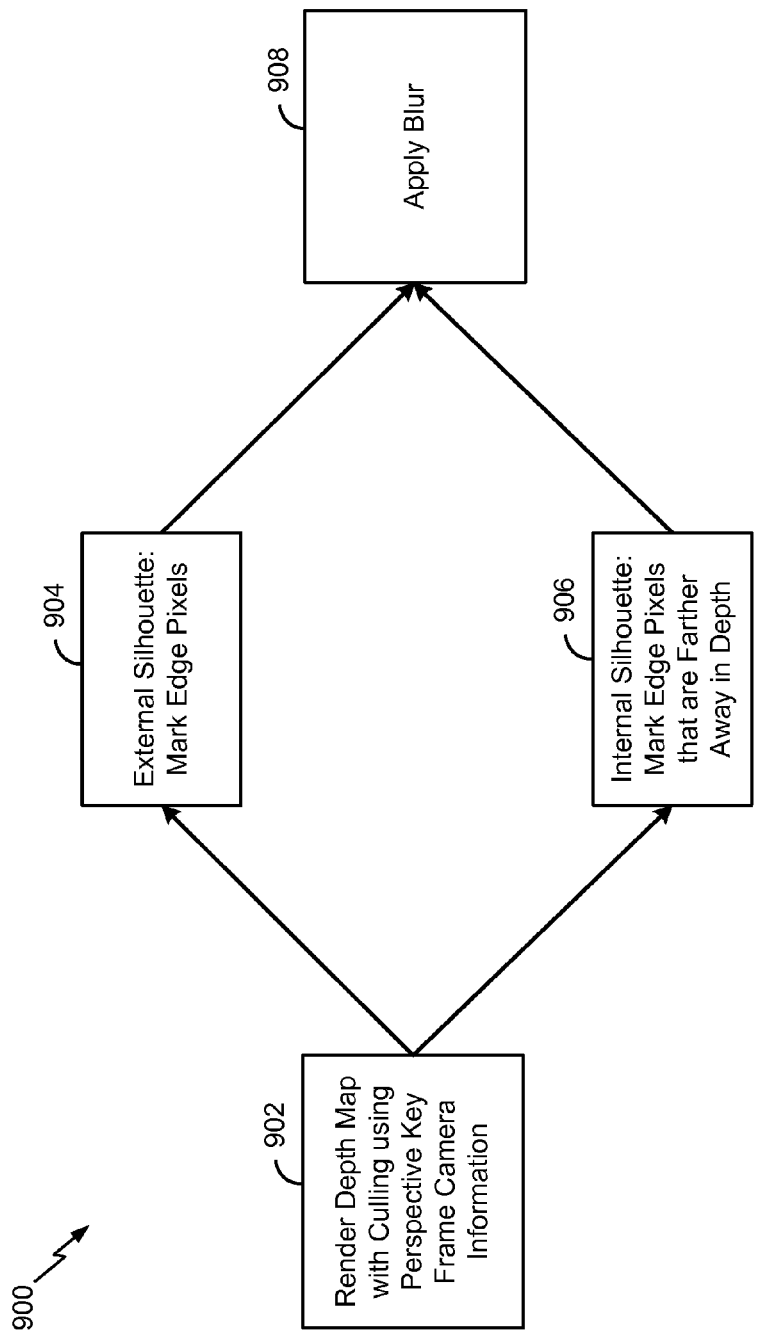
FIG. 9 is another process diagram for correcting pixel values associated with a 3D scan of an object.

Referring to FIG. 9, another process diagram 900 of creating a camera pose error correction matte for correcting pixel values associated with a 3D scan of an object is shown. Operations illustrated in the process diagram 900 may be implemented using the 3D model optimizer 118 of FIG. 1.

According to the process diagram 900, a processor (e.g., the 3D model optimizer 118) may render a depth map with depth culling using perspective key frame camera information, at 902. For example, the processor may implicitly identify and correctly avoid processing occluded (e.g., hidden) pixels corresponding to sub-portions of triangles that were not captured by an image capture device.

The processor may use the render of 902 to generate an external silhouette matte, at 904, and may mark edge pixels within a configurable radius or distance of the edge in each image frame. The processor may also generate an internal silhouette matte, at 906, and may mark edge pixels within a configurable radius or distance that are farther away in depth from the camera's point of view. The amount and type of blur applied, at 908, may be different between the internal silhouette matte and the external silhouette matte. The blur applied to either internal or external silhouette mattes may be a uniformly applied blur, or may be a non-uniformly applied blur, with little or no blurring near the edge. Blurring may increase for the matte pixels that are farther away from the edge. The blur may be applied using fall-off blend processing. Alternatively, the internal matte at 906 may be generated in a single step such that the increasing falloff from the edge is already implemented and no additional falloff or blur in 908 is required.

Figure 10:
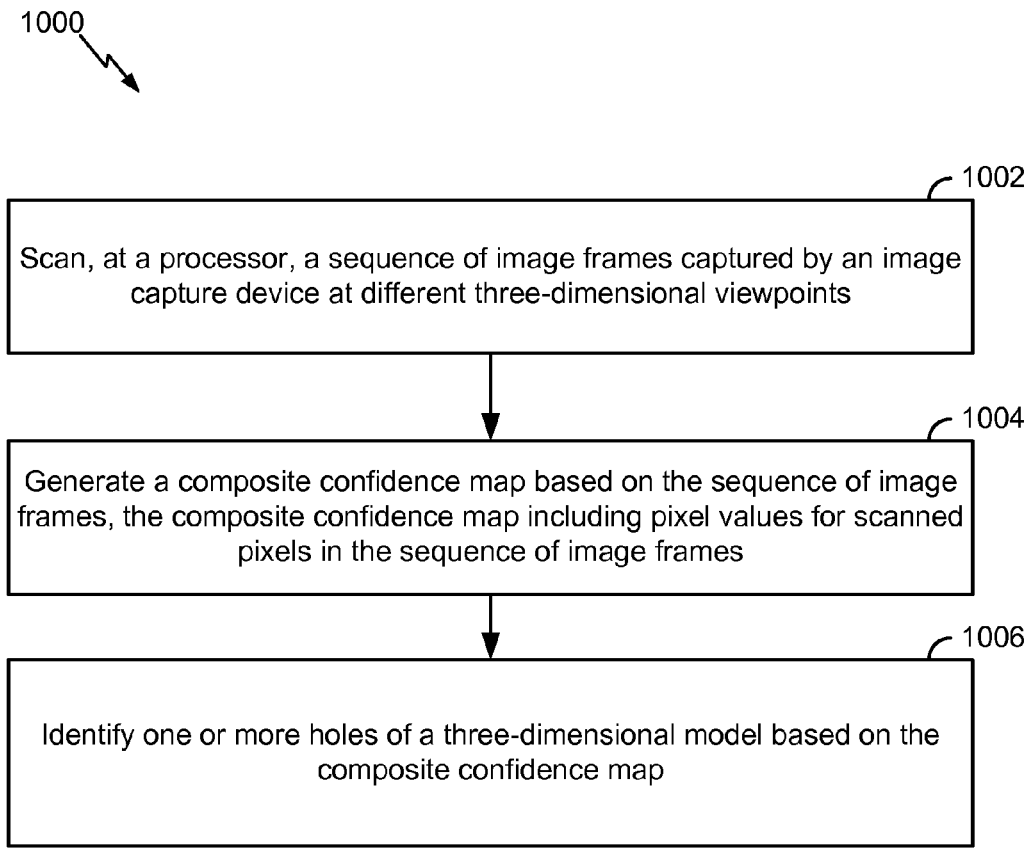
FIG. 10 is a flow diagram of a method for correcting pixel values associated with a 3D scan of an object.

Referring to FIG. 10, a method 1000 for texture reconstruction and for generating a texture for a 3D model from input images is shown is shown. The method 1000 may be performed by the 3D model optimizer 118 of FIG. 1.

The method 1000 includes scanning, at a processor, a sequence of image frames captured by an image capture device at different three-dimensional viewpoints, at 1002. For example, the processor may scan image frames captured by the image capture device 202 of FIG. 2.

A composite confidence map may be generated based on the sequence of image frames, at 1004. The composite confidence map may include pixel values for scanned pixels in the sequence of image frames. One or more holes of a three-dimensional model may be identified based on the composite confidence map, at 1006.

According to one implementation, the method 1000 may also include filling in at least one hole using color-per-vertex rendering and using the composite confidence map as an input channel. The method 1000 may also include identifying hole triangles of the three-dimensional model based on the composite confidence map. The hole triangles may correspond to portions of the object that the image capture device failed to capture. The hole triangles may also correspond to triangles of the three-dimensional model that include texture pixels having deleted pixel values. The hole triangles may also be filled in using color-per-vertex rendering and using the composite confidence map as the input channel.

The method 1000 of FIG. 10 may enable un-scanned areas and "aggressively" erased areas of the object to be "filled in" at corresponding texture pixels of the 3D model based on the final composite confidence map. Filling in the corresponding texture pixels based on the final composite confidence map may generate 3D model of an object having a relatively high degree of accuracy.

Figure 11:
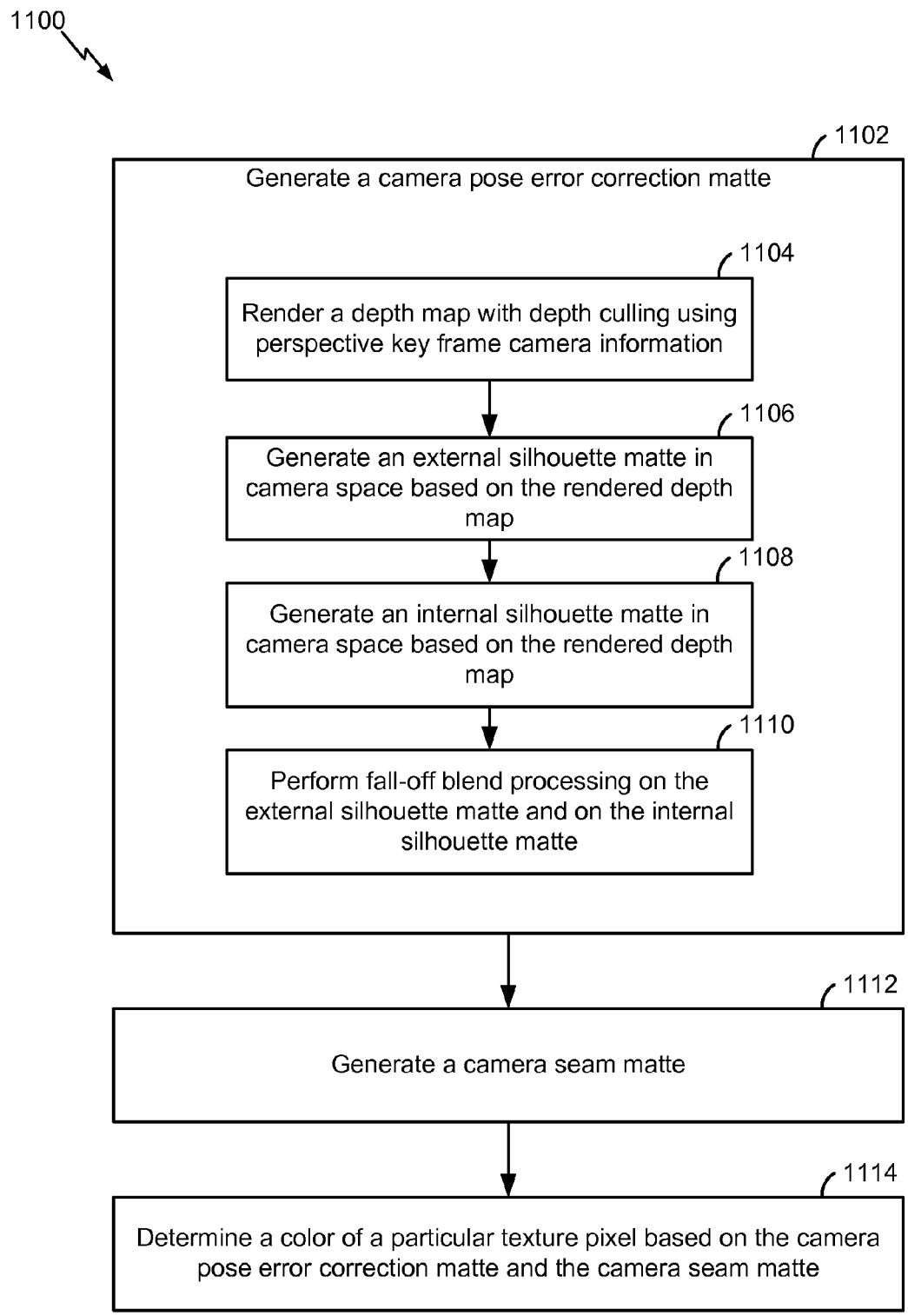
FIG. 11 is a flow diagram of a method of creating a camera pose error correction matte for correcting pixel values associated with a 3D scan of an object.

Referring to FIG. 11, a method 1100 of creating a camera pose error correction matte for correcting pixel values associated with a 3D scan of an object is depicted. The method 1100 may be performed by the 3D model optimizer 118 of FIG. 1.

The method 1100 includes generating a camera pose error correction matte, at 1102. Generating the camera pose error correction matte may include rendering a depth map with depth culling using perspective key frame camera information, at 1104. Generating the camera pose error correction matte may also include generating an external silhouette matte in camera space based on the rendered depth map, at 1106. Generating the camera pose error correction matte may further include generating an internal silhouette matte in camera space based on the rendered depth map, at 1108. Generating the camera pose error correction matte may also include performing fall-off blend processing on the external silhouette matte and on the internal silhouette matte, at 1110.

A camera seam matte may be generated, at 1112. Additionally, a color of a particular texture pixel may be determined based on the camera pose error correction matte and the camera seam matte, at 1114.

The method 1100 of FIG. 11 may enable un-scanned areas and "aggressively" erased areas of the object to be "filled in" at corresponding texture pixels of the 3D model based on the final composite confidence map. Filling in the corresponding texture pixels based on the final composite confidence map may generate 3D model of an object having a relatively high degree of accuracy.

Figure 12:
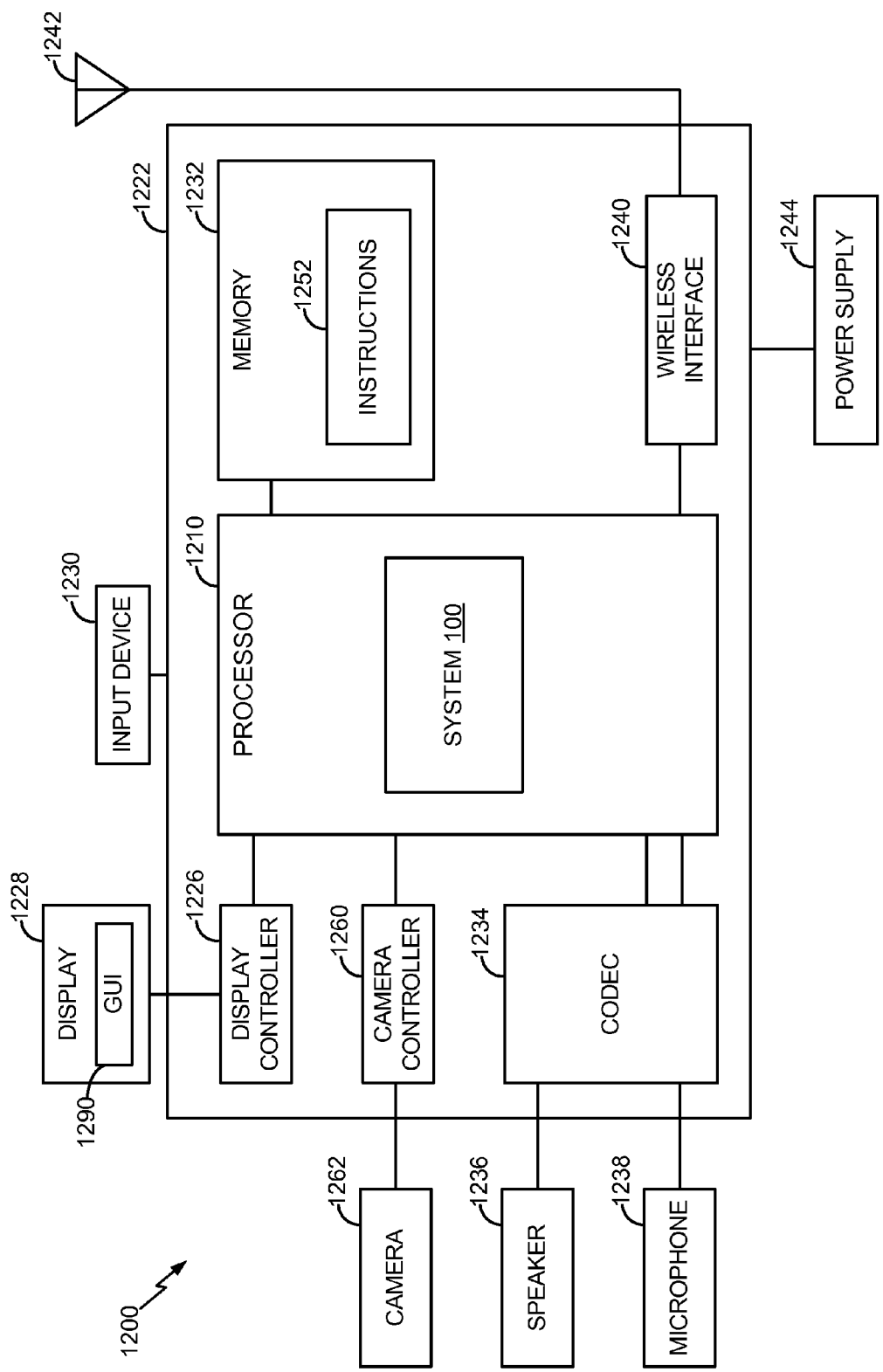
FIG. 12 is a block diagram of a computing device that includes components configured to perform one or more of the techniques, methods, and processes described with respect to FIGS. 1-11.

Referring to FIG. 12, a block diagram of a particular illustrative implementation of an electronic device, such as a wireless communication device, is depicted and generally designated 1200. The device 1200 includes a processor 1210, such as a digital signal processor (DSP), coupled to a memory 1232. The processor 1210 may include hardware or executable instructions that cause the processor to perform the method 400 of FIG. 4, the method 700 of FIG. 7, the method 1000 of FIG. 10, the method 1100 of FIG. 11, or a combination thereof. According to some implementations, the processor 1210 may include the system 100 of FIG. 1. The memory 1232 may be a non-transient or non-transitory computer readable medium storing computer-executable instructions 1252 to perform all or a portion of one or more operations described with reference to FIGS. 1-11.

FIG. 12 also shows a display controller 1226 that is coupled to the digital signal processor 1210 and to a display 1228, such as the display 104 of FIG. 1. A coder/decoder (CODEC) 1234 can also be coupled to the digital signal processor 1210. A speaker 1236 and a microphone 1238 can be coupled to the CODEC 1234.

FIG. 12 also indicates that a wireless interface 1240 can be coupled to the processor 1210 and to an antenna 1242. A camera 1262 may be coupled to the processor 1210 via a camera controller 1260. For example, the camera controller 1260 may include interface circuitry that is configured to receive image frames of an object. The interface circuitry may correspond to circuitry that receives the captured image frames from the camera 1262 and provides the captured image frames to the processor 1210. The image frames may be associated with a three-dimensional scan of the object. The camera 1262 may include a 2D camera, a 3D camera, a 3D sensor, a depth-sensing camera (e.g., an RGB-D camera), or any other device configured to capture images. In a particular implementation, the processor 1210, the display controller 1226, the camera controller 1260, the memory 1232, the CODEC 1234, and the wireless interface 1240 are included in a system-in-package or system-on-chip device 1222. In a particular implementation, an input device 1230 and a power supply 1244 are coupled to the system-on-chip device 1222. Moreover, in a particular implementation, as illustrated in FIG. 12, the display 1228, the input device 1230, the speaker 1236, the microphone 1238, the antenna 1242, the camera 1262, and the power supply 1244 are external to the system-on-chip device 1222. However, each of the display 1228, the input device 1230, the speaker 1236, the microphone 1238, the antenna 1242, the camera 1262, and the power supply 1244 can be coupled to a component of the system-on-chip device 1222, such as an interface or a controller.

In conjunction with the described implementations, a first apparatus may include means for scanning a first image frame of a sequence of image frames. For example, the means for scanning may include the texture mapping unit 126 of FIG. 1, the color correction unit 124 of FIG. 1, the processor 1210 of FIG. 12, one or more other structures, devices, circuits, or a combination thereof.

The first apparatus may also include means for determining a grayscale threshold based on characteristics of the first image frame to identify gray pixel candidates in the first image frame. For example, the means for determining the grayscale threshold may include the texture mapping unit 126 of FIG. 1, the color correction unit 124 of FIG. 1, the processor 1210 of FIG. 12, one or more other structures, devices, circuits, or a combination thereof.

The first apparatus may also include means for adjusting a pixel value of each pixel in the first image frame based on a chromatic adaptation transform estimation. For example, the means for adjusting the pixel value may include the texture mapping unit 126 of FIG. 1, the color correction unit 124 of FIG. 1, the processor 1210 of FIG. 12, one or more other structures, devices, circuits, or a combination thereof.

In conjunction with the described implementations, a second apparatus may include means for capturing a sequence of image frames during a three-dimensional scan of an object. For example, the means for capturing the sequence of image frames may include the image capturing device 202 of FIG. 2, the camera 1262 of FIG. 12, one or more other structures, devices, sensors, or a combination thereof.

The second apparatus may also include means for generating a composite confidence map based on the sequence of image frames. The composite confidence map may include pixel values for scanned pixels in the sequence of image frames. For example, the means for generating the composite confidence map may include the 3D model optimizer 118, the processor 1210 of FIG. 12, one or more other structures, devices, circuits, or a combination thereof.

The second apparatus may also include means for identifying hole borders of a three-dimensional model based on the composite confidence map. For example, the means for identifying the hole borders may include the 3D model optimizer 118, the processor 1210 of FIG. 12, one or more other structures, devices, circuits, or a combination thereof.

In conjunction with the described implementations, a third apparatus may include means for prioritizing a sequence of image frames in a queue. The sequence of images frames may be captured from an image capture device. The sequence of image frames may be prioritized based on one or more prioritization parameters. The one or more prioritization parameters may include an image frame timestamp weight, an image frame blur weight, an image frame color shift weight, an image frame face weight, or an image frame validity weight. For example, the means for prioritizing the sequence of image frames may include the texture mapping unit 126 of FIG. 1, the color correction unit 124 of FIG. 1, the processor 1210 of FIG. 12, one or more other structures, devices, circuits, or a combination thereof.

The third apparatus may also include means for selecting a first image frame from the queue. The first image frame depicts a particular texture pixel from a first angle. For example, the means for selecting the first image frame may include the texture mapping unit 126 of FIG. 1, the color correction unit 124 of FIG. 1, the processor 1210 of FIG. 12, one or more other structures, devices, circuits, or a combination thereof.

The third apparatus may also include means for determining a pixel value of the particular texture pixel in the first image frame. For example, the means for determining the pixel value may include the texture mapping unit 126 of FIG. 1, the color correction unit 124 of FIG. 1, the processor 1210 of FIG. 12, one or more other structures, devices, circuits, or a combination thereof.

The third apparatus may also include means for selecting a second image frame from the queue. The second image frame depicts the particular texture pixel from a second angle. The second image frame has a higher priority than the first image frame based on the one or more prioritization parameters. For example, the means for selecting the second image frame may include the texture mapping unit 126 of FIG. 1, the color correction unit 124 of FIG. 1, the processor 1210 of FIG. 12, one or more other structures, devices, circuits, or a combination thereof.

The third apparatus may also include means for modifying the pixel value of the particular pixel based on a pixel value of the particular pixel in the second image frame to generate a modified pixel value of the particular pixel. For example, the means for modifying the pixel value may include the texture mapping unit 126 of FIG. 1, the color correction unit 124 of FIG. 1, the processor 1210 of FIG. 12, one or more other structures, devices, circuits, or a combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
interface circuitry configured to receive a sequence of image frames associated with a three-dimensional scan of an object; and
a processor configured to:
iteratively generate a composite confidence map based on the sequence of image frames, the composite confidence map including pixel values for scanned pixels in the sequence of image frames;
identify, in the composite confidence map, a particular pixel value for a texture coordinate for a three-dimensional (3D) model, the 3D model generated based on the sequence of image frames;
identify a hole triangle based on the particular pixel value corresponding to a black value; and
composite texture over the hole triangle using the composite confidence map as an alpha channel.

2. The apparatus of claim 1, wherein the processor is further configured to fill the hole triangle using color-per-vertex rendering.

3. The apparatus of claim 1, wherein the processor and the interface circuitry are integrated into a mobile device.

4. The apparatus of claim 1, wherein the processor and the interface circuitry are integrated into an aircraft, an automobile, a drone, a robot, a camera, an unmanned vehicle, or a processing system communicatively coupled to one or more mounted cameras.

5. The apparatus of claim 1, wherein generating the composite confidence map includes updating pixel value weights for the scanned pixels based on a respective pixel value of each respective image frame and based on a camera pose associated with each respective image frame, the camera pose including a camera position and a camera orientation.

6. The apparatus of claim 1, wherein the particular triangle represents a hole border vertex if the particular pixel value is grey.

7. The apparatus of claim 1, wherein the apparatus is a wireless communication device, further comprising:
a transmitter configured to transmit the composite confidence map.

8. The apparatus of claim 7, wherein the wireless communication device is a cellular telephone and the composite confidence map is transmitted by the transmitter and modulated according to a cellular communication standard.

9. The apparatus of claim 1, wherein the processor is further configured to:
iteratively generate a camera pose error correction matte for each frame of the sequence of image frames, the camera pose error correction matte indicating a boundary of the object from a background;
iteratively generate a camera seam matte for each frame of the sequence of image frames; and
iteratively generate a color texture map for each frame of the sequence of image frames based on the camera pose error correction matte and the camera seam matte.

10. The apparatus of claim 1, wherein the processor is further configured to:
generate an updated 3D model based on the composited texture over the hole triangle.

11. A method for texture reconstruction associated with a three-dimensional scan of an object, the method comprising:
scanning, at a processor, a sequence of image frames captured by an image capture device, wherein each image frame in the sequence of image frames is captured at a different three-dimensional viewpoint;
iteratively generating a composite confidence map based on the sequence of image frames, the composite confidence map including pixel values for scanned pixels in the sequence of image frames;
identifying, in the composite confidence map, a particular pixel value for a texture coordinate for a three-dimensional (3D) model, the 3D model generated based on the sequence of image frames; and
identifying a hole triangle based on the particular pixel value corresponding to a black value; and
compositing texture over the hole triangle using the composite confidence map as an alpha channel.

12. The method of claim 11, further comprising filling the hole triangle using color-per-vertex rendering.

13. The method of claim 11, wherein the processor and the image capture device are integrated into a mobile device.

14. The method of claim 11, wherein the processor and the image capture device are integrated into an aircraft, an automobile, a drone, a robot, a camera, an unmanned vehicle, or a processing system communicatively coupled to one or more mounted cameras.

15. The method of claim 11, the method being executable on a wireless communication device, wherein the wireless device comprises:
a memory configured to store the sequence of image frames;
the processor configured to execute instructions to iteratively generate the composite confidence map based on the sequence of image frames stored in the memory; and
a transmitter configured to transmit the composite confidence map.

16. The method of claim 15, wherein the wireless communication device is a cellular telephone and the composite confidence map is transmitted by the transmitter and modulated according to a cellular communication standard.

17. The method of claim 11, wherein the method further comprises:
iteratively generating a camera pose error correction matte for each frame of the sequence of image frames, the camera pose error correction matte indicating a boundary of the object from a background;
iteratively generating a camera seam matte for each frame of the sequence of image frames; and
iteratively generating a color texture map for each frame of the sequence of image frames based on the camera pose error correction matte and the camera seam matte.

18. The method of claim 11, wherein the method further comprises:
generating an updated 3D model based on the composited texture over the hole triangle.

19. A non-transitory computer-readable medium comprising instructions for texture reconstruction associated with a three-dimensional scan of an object, the instructions, when executed by processor, cause the processor to perform operations comprising:
scanning a sequence of image frames captured by an image capture device, wherein each image frame in the sequence of image frames is captured at a different three-dimensional viewpoint;
iteratively generating a composite confidence map based on the sequence of image frames, the composite confidence map including pixel values for scanned pixels in the sequence of image frames;
identifying, in the composite confidence map, a particular pixel value for a texture coordinate for a three-dimensional (3D) model, the 3D model generated based on the sequence of image frames;

identifying a hole triangle based on the particular pixel value corresponding to a black value; and compositing texture over the hole triangle using the composite confidence map as an alpha channel.

20. The non-transitory computer-readable medium of claim 19, wherein the operations further comprise filling the hole triangle using color-per-vertex rendering.

21. The non-transitory computer-readable medium of claim 19, wherein the processor and the image capture device are integrated into a mobile device.

22. The non-transitory computer-readable medium of claim 19, wherein the processor and the image capture device are integrated into an aircraft, an automobile, a drone, a robot, a camera, an unmanned vehicle, or a processing system communicatively coupled to one or more mounted cameras.

23. The non-transitory computer-readable medium of claim 19, wherein the operations further comprise:

iteratively generating a camera pose error correction matte for each frame of the sequence of image frames, the camera pose error correction matte indicating a boundary of the object from a background;

iteratively generating a camera seam matte for each frame of the sequence of image frames; and iteratively generating a color texture map for each frame of the sequence of image frames based on the camera pose error correction matte and the camera seam matte.

24. The non-transitory computer-readable medium of claim 19, wherein the operations further comprise:

generating an updated 3D model based on the composited texture over the hole triangle.

* * * * *